(12) United States Patent (10) Patent No.: US 12,003,875 B2
Kobayashi (45) Date of Patent: Jun. 4, 2024

(54) PHOTOELECTRIC CONVERSION DEVICE AND METHOD OF DRIVING PHOTOELECTRIC CONVERSION DEVICE

(71) Applicant: CANON KABUSHIKI KAISHA, Tokyo (JP)

(72) Inventor: Daisuke Kobayashi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 137 days.

(21) Appl. No.: 17/818,476

(22) Filed: Aug. 9, 2022

(65) Prior Publication Data

US 2023/0079653 A1 Mar. 16, 2023

(30) Foreign Application Priority Data

Sep. 15, 2021 (JP) ................................ 2021-150295

(51) Int. Cl.
*H04N 25/75* (2023.01)
*G01S 17/894* (2020.01)
*H04N 25/78* (2023.01)

(52) U.S. Cl.
CPC .............. *H04N 25/75* (2023.01); *H04N 25/78* (2023.01); *G01S 17/894* (2020.01)

(58) Field of Classification Search
CPC ........ H04N 25/75; H04N 25/76; H04N 25/77; H04N 25/78
See application file for complete search history.

(56) References Cited

U.S. PATENT DOCUMENTS

| 9,142,575 | B2 | 9/2015 | Kobayashi |
| 9,680,494 | B2 * | 6/2017 | Hashimoto ............ H04N 23/00 |
| 9,900,539 | B2 | 2/2018 | Yamasaki |
| 10,194,103 | B2 | 1/2019 | Saito |
| 10,249,678 | B2 | 4/2019 | Ryoki |
| 10,504,949 | B2 | 12/2019 | Kobayashi |
| 10,834,354 | B2 | 11/2020 | Kobayashi |
| 2015/0189210 | A1 | 7/2015 | Shimizu |
| 2016/0360129 | A1 | 12/2016 | Yoshida et al. |
| 2019/0166323 | A1 * | 5/2019 | Saito ......................... G06T 7/55 |

(Continued)

FOREIGN PATENT DOCUMENTS

| JP | 2015-128253 A | 7/2015 |
| JP | 2016-54424 A | 4/2016 |

(Continued)

*Primary Examiner* — Kelly L Jerabek
(74) *Attorney, Agent, or Firm* — VENABLE LLP

(57) ABSTRACT

The disclosed photoelectric conversion device includes a pixel including a photoelectric conversion unit, an AD conversion unit that performs an AD conversion on an analog signal generated in the pixel, and a control unit configured to control the AD conversion unit. The control unit is configured to control the AD conversion unit to perform a plurality of times of the AD conversion on the same analog signal. A length of a first AD conversion period of the plurality of times is shorter than a length of a second AD conversion period of the plurality of times. A change rate of the reference signal in the second AD conversion period is smaller than a change rate of the reference signal in the first AD conversion period. In each of the first and second AD conversion periods, a potential of the reference signal changes to a first level.

24 Claims, 29 Drawing Sheets

(56) References Cited

U.S. PATENT DOCUMENTS

| | | |
|---|---|---|
| 2020/0066772 A1 | 2/2020 | Kobayashi |
| 2021/0274119 A1* | 9/2021 | Nakamura ............. H04N 25/57 |
| 2021/0375975 A1 | 12/2021 | Kobayashi |
| 2022/0247957 A1 | 8/2022 | Itano |
| 2022/0247965 A1 | 8/2022 | Kobayashi |
| 2022/0303492 A1 | 9/2022 | Itano |

FOREIGN PATENT DOCUMENTS

| | | |
|---|---|---|
| JP | 2017-5392 A | 1/2017 |
| JP | 2017-152838 A | 8/2017 |
| JP | 2018-125845 A | 8/2018 |
| JP | 2019-165313 A | 9/2019 |

* cited by examiner

PHOTOELECTRIC CONVERSION DEVICE AND METHOD OF DRIVING PHOTOELECTRIC CONVERSION DEVICE

BACKGROUND OF THE INVENTION

Field of the Invention

The present invention relates to a photoelectric conversion device and a method of driving a photoelectric conversion device.

Description of the Related Art

In a photoelectric conversion device such as a solid-state imaging device, in order to improve the S/N ratio, reduction of a noise level, enlargement of a dynamic range, and high-speed readout are required. In response to such a demand, Japanese Patent Application Laid-Open No. 2015-128253 discloses a technology for expanding a dynamic range by providing a plurality of amplifiers that amplify an output signal from an imaging element at different amplification factors and selecting/compositing signal outputs of the plurality of amplifiers according to brightness of an object. Japanese Patent Application Laid-Open No. 2016-054424 discloses a technology for increasing speed by changing a length of a period of performing an analog-to-digital conversion on an output signal of an amplifier according to an amplification factor of the amplifier.

However, in the technology described in Japanese Patent Application Laid-Open No. 2015-128253, when an image is obtained by compositing a plurality of output signals, image quality may be degraded due to offset and/or gain error between output signals due to characteristic variation among signal processing circuits including a plurality of amplifiers. As a measure for this, a configuration in which the same signal processing circuit sequentially performs signal processing at different amplification factors can be considered, but it cannot be said that the configuration is suitable for speeding up the readout because the readout time increases. Further, the technology described in Japanese Patent Application Laid-Open No. 2016-054424 has a configuration capable of increasing the speed of analog-to-digital conversion when the output amplitude of the amplifier is small, but it has not been sufficiently studied from the viewpoint of S/N ratio and dynamic range.

SUMMARY OF THE INVENTION

An object of the present invention is to provide an advantageous technique for improving the performance of a photoelectric conversion device.

According to an embodiment of the present disclosure, there is provided a photoelectric conversion device including a pixel including a photoelectric conversion unit, an AD conversion unit that performs an AD conversion on an analog signal generated in the pixel by comparing a level of the analog signal with a level of a reference signal whose level changes with time, and a control unit configured to control the AD conversion unit, wherein the control unit is configured to control the AD conversion unit to perform a plurality of times of the AD conversion on the same analog signal generated in the pixel, wherein a length of a first AD conversion period of the plurality of times of the AD conversion is shorter than a length of a second AD conversion period of the plurality of times of the AD conversion, wherein a rate of change with respect to time of the reference signal used in the second AD conversion period is smaller than a rate of change with respect to time of the reference signal used in the first AD conversion period, wherein, in the second AD conversion period, a potential of the reference signal changes to a first level, and wherein, in the first AD conversion period, a potential of the reference signal changes to the first level.

According to another embodiment of the present specification, there is provided a method of driving a photoelectric conversion device including a pixel including a photoelectric conversion unit, and an AD conversion unit configured to perform an AD conversion on an analog signal generated in the pixel by comparing a level of the analog signal with a level of a reference signal whose level changes with time, the method including performing a plurality of times of the AD conversion with different lengths of AD conversion periods on the same analog signal generated in the pixel to acquire a plurality of digital signals corresponding to the plurality of times of the AD conversion, and generating an image signal by compositing the plurality of digital signals, wherein a length of a first AD conversion period of the plurality of times of the AD conversion is shorter than a length of a second AD conversion period of the plurality of times of the AD conversion, a rate of change with respect to time of the reference signal used in the second AD conversion period is smaller than a rate of change with respect to time of the reference signal used in the first AD conversion period, a potential of the reference signal changes to a first level in the second AD conversion period, and a potential of the reference signal changes to the first level in the first AD conversion period.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
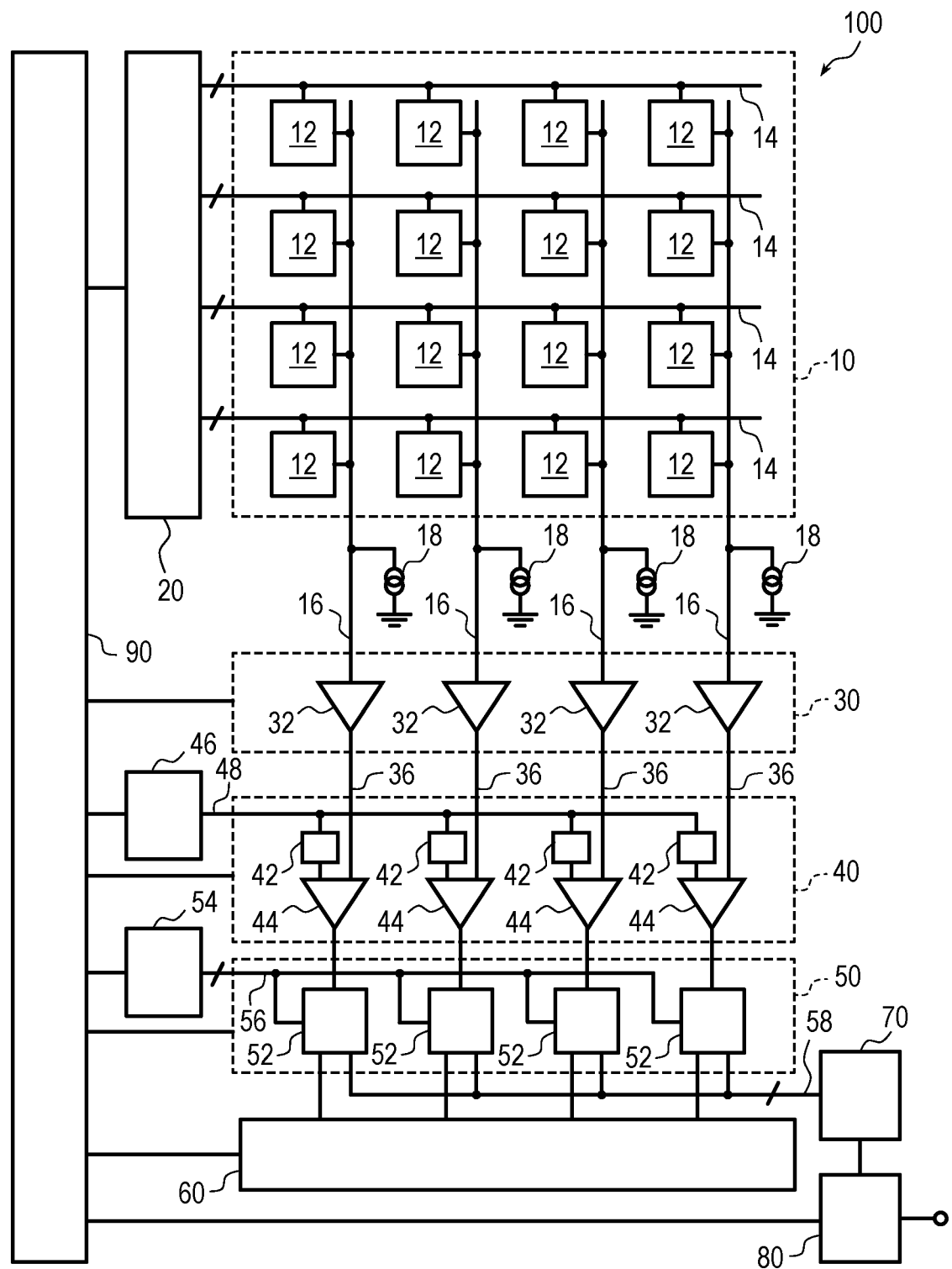
FIG. 1 is a schematic diagram illustrating a configuration example of a photoelectric conversion device according to a first embodiment of the present invention.
Figure 2:
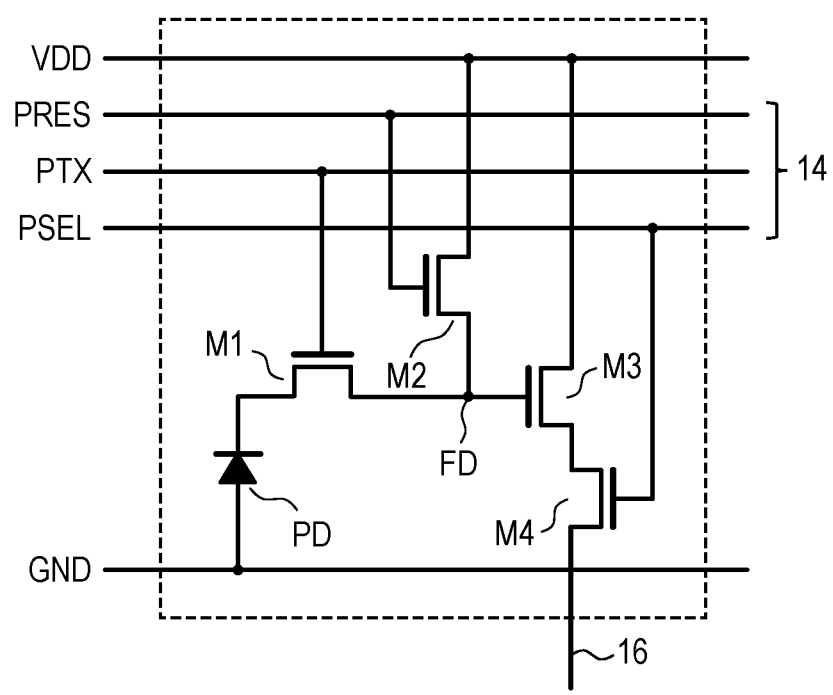
FIG. 2 is an equivalent circuit diagram illustrating a configuration example of a pixel in the photoelectric conversion device according to the first embodiment of the present invention.
Figure 3:
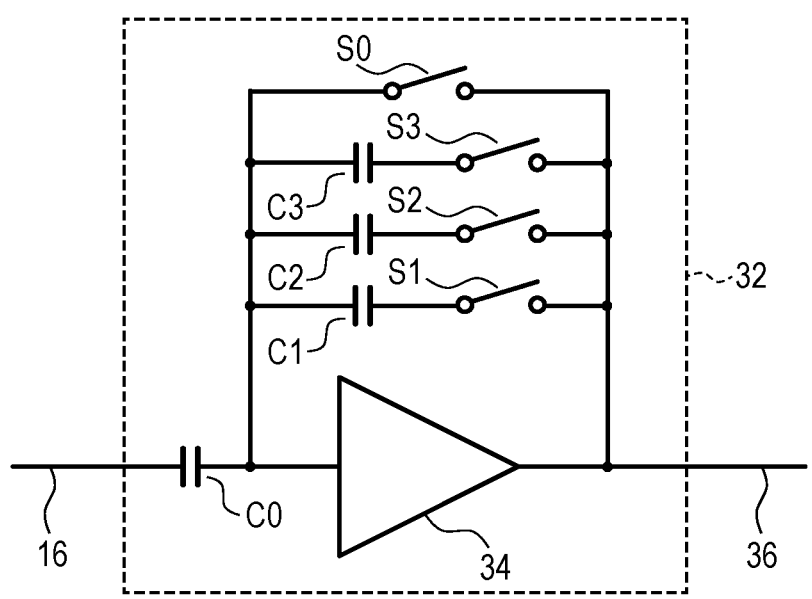
FIG. 3 is an equivalent circuit diagram illustrating a configuration example of an amplifier in the photoelectric conversion device according to the first embodiment of the present invention.

A structure of a photoelectric conversion device according to a first embodiment of the present invention will be described with reference to FIG. 1 to FIG. 3. FIG. 1 is a schematic diagram illustrating a configuration example of a photoelectric conversion device according to the present embodiment. FIG. 2 is an equivalent circuit diagram illustrating a configuration example of a pixel in the photoelectric conversion device according to the present embodiment. FIG. 3 is an equivalent circuit diagram illustrating a configuration example of an amplifier in the photoelectric conversion device according to the present embodiment.

As illustrated in FIG. 1, the photoelectric conversion device 100 according to the present embodiment includes a pixel unit 10, a pixel driving unit 20, an amplification unit 30, a comparison unit 40, a memory unit 50, a horizontal scanning unit 60, a digital signal processing unit 70, an output unit 80, and a timing generation unit 90. The photoelectric conversion device 100 further includes a reference signal generation unit 46 and a counter unit 54.

The pixel unit 10 includes a plurality of pixels 12 arranged in a matrix form over a plurality of rows and a plurality of columns. Each pixel 12 includes a photoelectric conversion unit including a photoelectric conversion element such as a photodiode, and outputs a pixel signal corresponding to an amount of incident light. Each pixel 12 may comprise a color filter having a predetermined spectral sensitivity characteristic. The number of rows and columns of the pixel array arranged in the pixel unit 10 is not particularly limited. In addition, in the pixel unit 10, in addition to effective pixels that output pixel signals according to the amount of incident light, optical black pixels in which the photoelectric conversion unit is shielded from light, dummy pixels that do not output signals, and the like may be arranged.

In each row of the pixel unit 10, a pixel driving signal line 14 is arranged so as to extend in a first direction (lateral direction in FIG. 1). The pixel driving signal line 14 in each row is connected to the pixels 12 arranged in the first direction, respectively, and serve as a signal line common to these pixels 12. The first direction in which the pixel driving signal lines 14 extend may be referred to as a row direction or a horizontal direction. The pixel driving signal lines 14 are connected to the pixel driving unit 20.

In each column of the pixel unit 10, a pixel output line 16 is arranged so as to extend in a second direction (vertical direction in FIG. 1) intersecting with the first direction. The pixel output line 16 in each column is connected to the pixels 12 arranged in the second direction, and serve as a signal line common to these pixels 12. The second direction in which the pixel output lines 16 extend may be referred to as a column direction or a vertical direction. A current source 18 is connected to each of the pixel output lines 16. The pixel output lines 16 are connected to the amplification unit 30.

The pixel driving unit 20 is a control circuit unit having a function of receiving a control signal supplied from the timing generation unit 90, generating a control signal for driving the pixel 12, and supplying the control signal to the pixel 12 via the pixel driving signal line 14. A logic circuit such as a shift register or an address decoder may be used for the pixel driving unit 20. The pixel driving unit 20 may be configured to sequentially supply control signals to the pixel driving signal lines 14 of each row, and sequentially drive the pixels 12 of the pixel unit 10 in units of rows. The signals read out from the pixels 12 in units of rows are input to the amplification unit 30 via the pixel output lines 16 provided in each column of the pixel unit 10.

The amplification unit 30 includes a plurality of amplifiers 32 provided corresponding to each column of the pixel unit 10. Each of the amplifiers 32 has an input node connected to the pixel output line 16 in the corresponding column and an output node. An output node of each of the plurality of amplifiers 32 is connected to an amplified signal output line 36 of a corresponding column among a plurality of amplified signal output lines 36 provided corresponding to each column of the pixel unit 10. The plurality of amplified signal output lines 36 are connected to the comparison unit 40.

The reference signal generation unit 46 is a circuit unit that receives a control signal supplied from the timing generation unit 90, generates a reference signal to be used for analog-digital conversion (AD conversion), and outputs the generated reference signal to the comparison unit 40 via a reference signal output line 48. The reference signal is a signal whose signal level changes over time, for example, a ramp signal. The ramp signal is a signal whose signal level gradually changes (increases or decreases) from a predetermined value at a constant rate of change over time. In the following description, the rate of change of the reference signal (lamp signal) with respect to time may be expressed as the slope of the reference signal (lamp signal). The reference signal may be any signal having a predetermined amplitude that can be applied to the AD conversion, and is not necessarily limited to a ramp signal.

The comparison unit 40 includes a plurality of buffer circuits 42 and a plurality of comparators 44 provided corresponding to each column of the pixel unit 10. Each of the comparators 44 has a first input node connected to the amplified signal output line 36 of the corresponding column, a second input node connected to the reference signal output line 48 via the buffer circuit 42 of the corresponding column, and an output node. The output nodes of the comparators 44 are connected to the memory unit 50.

The counter unit 54 is a circuit unit that receives a control signal supplied from the timing generation unit 90, generates a count signal whose count value transits at a constant frequency, and outputs the count signal generated via the count signal line 56 to the memory unit 50. The count signal includes a plurality of bits, and the count signal line 56 includes a plurality of signal lines corresponding to the number of bits of the count signal.

The memory unit 50 includes a plurality of memories 52 provided corresponding to each column of the pixel unit 10. Each of the plurality of memories 52 is composed of a plurality of bits. Each of the plurality of memories 52 includes a first input node connected to the output node of the comparator 44 of the corresponding column, a second input node connected to the count signal line 56, a third input node connected to the horizontal scanning unit 60, and an output node connected to the horizontal transfer line 58. The memory 52 is configured to hold the count value indicated by the count signal received at the timing when a latch signal indicating that the magnitude relationship between the level of the output signal of the amplifier 32 and the level of the reference signal is reversed is output from the comparator 44. The count value held in the memory 52 in this manner becomes digital data of the pixel signal.

The horizontal scanning unit 60 is a control circuit unit having a function of receiving a control signal supplied from the timing generation unit 90, generating a control signal for reading out digital data of the pixel signal from the memory unit 50, and supplying the control signal to the memory unit 50. A control line of the horizontal scanning unit 60 provided corresponding to each column of the pixel unit 10 is connected to the memory 52 of the corresponding column. The horizontal transfer line 58 is connected to the digital signal processing unit 70.

The digital signal processing unit 70 has a function of performing digital signal processing such as addition/subtraction processing between data, digital gain processing, offset addition/subtraction processing, decoding processing, and data scrambling processing on the digital data transferred from the memory unit 50. The digital signal processing unit 70 is connected to the output unit 80.

The output unit 80 has a function of outputting data processed by the digital signal processing unit 70 to the outside of the photoelectric conversion device 100. For example, the output unit 80 may include a system of outputting a voltage from a single terminal, such as a buffer circuit, or a system of outputting LVDS (Low Voltage Differential Signaling) having two differential terminals. The output unit 80 may have a function of parallel/serial conversion (P/S conversion).

The timing generation unit 90 is a circuit for supplying control signals for controlling operations and timings of the pixel driving unit 20, the amplification unit 30, the comparison unit 40, the reference signal generation unit 46, the memory unit 50, the counter unit 54, the horizontal scanning unit 60, and the output unit 80. That is, the timing generation unit 90 functions as a control unit that controls the pixel driving unit 20, the amplification unit 30, the comparison unit 40, the reference signal generation unit 46, the memory unit 50, the counter unit 54, the horizontal scanning unit 60, and the output unit 80. At least a part of these control signals may be supplied from the outside of the photoelectric conversion device 100.

Next, an outline of the operation of the photoelectric conversion device 100 according to the present embodiment will be described with reference to FIG. 1.

Under the control of the timing generation unit 90, the pixel driving unit 20 performs an operation of driving the plurality of pixels 12 constituting the pixel unit 10 in units of rows, i.e., so-called vertical scanning, by the control signals supplied via the pixel driving signal lines 14. Thereby, the pixel signals of the plurality of pixels 12 are sequentially output in units of rows to the pixel output lines 16 of each column. The pixel signals output from each of the plurality of pixels 12 may include a signal (an optical signal or a photoelectric conversion signal) corresponding to an amount of signal corresponding to an amount of incident light to the photoelectric conversion unit and a signal (a reference signal or a reset signal) corresponding to an amount of noise. The pixel signal output from the pixel 12 to the pixel output line 16 is input to the amplification unit 30.

The pixel signal output from the pixel 12 via the pixel output line 16 is amplified at a predetermined amplification factor in the amplifier 32 of the corresponding column, and then input to the comparator 44 of the corresponding column. The comparator 44 compares the signal level of the pixel signal with the signal level of the reference signal input from the reference signal generation unit 46 via the buffer circuit 42, and outputs a latch signal at a timing when the magnitude relationship between the signal level of the pixel signal and the signal level of the ramp signal is reversed. A count signal supplied from the counter unit 54 and an output signal of the comparator 44 are input to the memory 52. The memory 52 stores the count value indicated by the count signal at the timing when the latch signal is received from the comparator 44 as digital data of the pixel signal. In this manner, the pixel signal, which is an analog signal output from the pixel 12, is converted into digital data (digital pixel signal). The comparison unit 40, the reference signal generation unit 46, the memory unit 50, and the counter unit 54 constitute an AD conversion unit that converts a pixel signal, which is an analog signal output from the pixel 12, into a digital signal.

Under the control of the timing generation unit 90, the horizontal scanning unit 60 sequentially outputs control signals for each column to the memory 52 of the memory unit 50. The memory 52 having received the control signal from the horizontal scanning unit 60 outputs the held digital pixel signal to the horizontal transfer line 58.

The digital pixel signal output to the horizontal transfer line 58 is subjected to predetermined digital signal processing in the digital signal processing unit 70 and then output to the outside of the photoelectric conversion device 100 via the output unit 80.

Next, a configuration example of the pixel 12 in the photoelectric conversion device 100 according to the present embodiment will be described with reference to FIG. 2.

As illustrated in FIG. 2, for example, each of the pixels 12 may include a photoelectric conversion element PD, a transfer transistor M1, a reset transistor M2, an amplifier transistor M3, and a select transistor M4. Each pixel 12 may include a microlens and a color filter arranged on an optical path until incident light is guided to the photoelectric conversion element PD. The microlenses have a role of condensing incident light onto the photoelectric conversion elements PD. The color filter selectively transmits light of a predetermined color.

The photoelectric conversion element PD is, for example, a photodiode, an anode of which is connected to a reference voltage line GND, and a cathode of which is connected to a source of the transfer transistor M1. A drain of the transfer transistor M1 is connected to a source of the reset transistor M2 and a gate of the amplifier transistor M3. A node to which the drain of the transfer transistor M1, the source of the reset transistor M2, and the gate of the amplifier transistor M3 are connected is a so-called floating diffusion FD. The floating diffusion FD includes a capacitance component (floating diffusion capacitor) and functions as a charge holding portion. The floating diffusion capacitor may include a p-n junction capacitance and an interconnection capacitance. A drain of the reset transistor M2 and a drain of the amplifier transistor M3 are connected to a power supply voltage line VDD (voltage VDD). A source of the amplifier transistor M3 is connected to a drain of the select transistor M4. A source of the select transistor M4 is connected to the pixel output line 16.

In the case of the pixel configuration of FIG. 2, the pixel driving signal line 14 of each row includes a signal line connected to a gate of the transfer transistor M1, a signal line connected to a gate of the reset transistor M2, and a signal line connected to a gate of the select transistor M4. A control signal PTX is supplied from the pixel driving unit 20 to the gate of the transfer transistor M1 via the signal line. A control signal PRES is supplied from the pixel driving unit 20 to the gate of the reset transistor M2 via the signal line. A control signal PSEL is supplied from the pixel driving unit 20 to the gate of the select transistor M4 via the signal line. When each transistor is formed of an n-channel MOS transistor, when a high-level control signal is supplied from the pixel driving unit 20, the corresponding transistor is turned on. When a low-level control signal is supplied from the pixel driving unit 20, the corresponding transistor is turned off.

In the present embodiment, a description will be given assuming a case where electrons are used as a signal charge among electron-hole pairs generated in the photoelectric conversion element PD by light incidence. When electrons are used as the signal charge, each transistor included in the pixel 12 may be formed of an n-channel MOS transistor. However, the signal charge is not limited to electrons, and holes may be used as the signal charge. When holes are used as the signal charge, the conductivity type of each transistor is opposite to that described in the present embodiment. In addition, the term "source" or "drain" of the MOS transistor may vary depending on the conductivity type of the transistor or the target function. Some or all of names of a source and a drain used in the present embodiment are sometimes referred to as reverse names.

The photoelectric conversion element PD converts (photoelectrically converts) incident light into charge of an amount corresponding to an amount of the incident light, and accumulates the generated charge. When the transfer transistor M1 is turned on, the charge held in the photoelectric conversion element PD is transferred to the floating diffusion FD. The charge transferred from the photoelectric conversion element PD is held in the capacitance component (floating diffusion capacitor) of the floating diffusion FD. As a result, the floating diffusion FD becomes a potential corresponding to the amount of charge transferred from the photoelectric conversion element PD by charge-voltage conversion by the floating diffusion capacitor.

When the select transistor M4 is turned on, the source of the amplifier transistor M3 is connected to the pixel output line 16. The amplifier transistor M3 is configured such that the voltage VDD is supplied to the drain and a bias current is supplied from the current source 18 to the source via the select transistor M4, and constitutes an amplifier unit (source follower circuit) having the gate as an input node. Accordingly, the amplifier transistor M3 outputs a signal based on the potential of the floating diffusion FD to the pixel output line 16 via the select transistor M4. In this sense, the amplifier transistor M3 and the select transistor M4 form an output unit that outputs a pixel signal corresponding to an amount of charge held in the floating diffusion FD.

The reset transistor M2 has a function of controlling supply of a voltage (the voltage VDD) for resetting the floating diffusion FD as a charge holding portion to the floating diffusion FD. When the reset transistor M2 is turned on, the floating diffusion FD is reset to a potential corresponding to the voltage VDD.

Next, a configuration example of the amplifier 32 in the photoelectric conversion device 100 according to the present embodiment will be described with reference to FIG. 3.

As illustrated in FIG. 3, for example, each of the amplifiers 32 may include an amplifier circuit 34, an input capacitor C0, feedback capacitors C1, C2, and C3, and switches S0, S1, S2, and S3. The amplifier circuit 34 may be, for example, a differential amplifier circuit. An input node of the amplifier circuit 34 is connected to the pixel output line 16 via an input capacitor C0. An output node of the amplifier circuit 34 is connected to the amplified signal output line 36. A switch S0, a series connection body of the feedback capacitor C1 and the switch S1, a series connection body of the feedback capacitor C2 and the switch S2, and a series connection body of the feedback capacitor C3 and the switch S3 are connected in parallel between the input node and the output node of the amplifier circuit 34.

When the amplifier circuit 34 is an inverting amplifier circuit, the voltage amplification factor of the amplifier 32 is expressed as −(input capacitance (C0)/feedback capacitance (C1 to C3)). The voltage amplification factor of the amplifier 32 may be switched by switching which of the feedback capacitors C1 to C3 is selected by the switches S1 to S3 to change the feedback coefficient determined by the voltage division ratio between the feedback capacitors C1 to C3 and the input capacitor C0. That is, the amplifier 32 is an amplifier configured to be capable of changing the voltage amplification factor. The control signals of the switches S0, S1, S2, and S3 are supplied from the timing generation unit 90.

Figure 4:
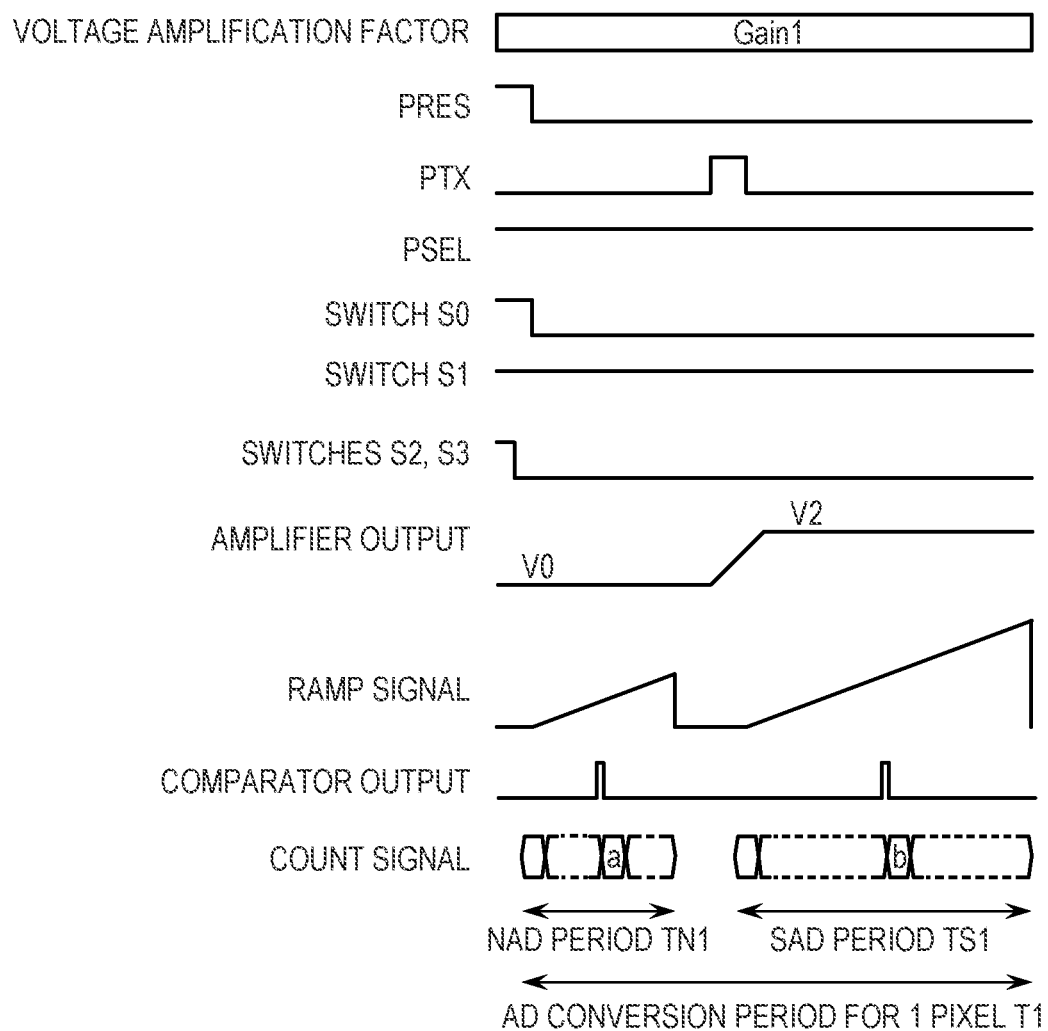
FIG. 4 and FIG. 5 are timing charts illustrating a method of driving a photoelectric conversion device.

Next, a standard driving example of the photoelectric conversion device according to the present embodiment will be described with reference to FIG. 4. FIG. 4 is a timing chart illustrating a method of driving the photoelectric conversion device according to the present embodiment. FIG. 4 illustrates temporal changes of the voltage amplification factor of the amplifier 32, the control signals PRES, PTX, and PSEL, the control signals of the switches S0, S1, S2, and S3, the output signal of the amplifier 32, the ramp signal, the output signal of the comparator 44, and the count signal. It is assumed that the switches S0, S1, S2, and S3 are turned on when the corresponding control signal is at a high level, and are turned off when the corresponding control signal is at a low level.

Prior to the readout operation, the photoelectric conversion element PD is exposed during a set period of time (exposure period). In the photoelectric conversion element PD, charge corresponding to an amount of light incident during the exposure period is accumulated. During this period, the control signal PRES is at a high level, the reset transistor M2 is turned on, and the gate of the amplifier transistor M3 and the floating diffusion FD are in a reset state. Further, the switches S0 to S3 are on, the amplifier circuit 34 is in the voltage follower state, and the amplified signal output line 36 is at the potential V0. At this time, both terminals of each of the feedback capacitors C1 to C3 are short-circuited, and these terminals are also at the potential V0.

First, the feedback capacitors C2 and C3 are disconnected from the feedback path of the amplifier circuit 34 by shifting the control signals of the switches S2 and S3 from the high level to the low level to turn off the switches S2 and S3.

Next, the reset state of the amplifier circuit 34 is released by shifting the control signal of the switch S0 from the high level to the low level to turn off the switch S0. The reset state of the gate of the amplifier transistor M3 and the floating diffusion FD is released by switching the control signal PRES from the high level to the low level to turn off the reset transistor M2. A potential corresponding to the release of the reset state is held in the floating diffusion FD. At this time, the control signal PSEL is at the high level and the select transistor M4 is turned on, and a signal having a potential corresponding to the reset potential of the floating diffusion FD is output to the pixel output line 16 by the source follower circuit configured by the amplifier transistor M3 and the current source 18.

Next, the charge accumulated in the photoelectric conversion element PD is transferred to the floating diffusion FD by shifting the control signal PTX to the high level for a predetermined period of time to turn on the transfer transistor M1. Here, when the absolute value of the amount of charge transferred to the floating diffusion FD is represented by Q and the capacitance of the floating diffusion FD is represented by CFD, the gate potential of the amplifier transistor M3 connected to the floating diffusion FD decreases by Q/CFD. The potential of the pixel output line 16 also changes in response to the change in the gate potential of the amplifier transistor M3. When the gain of the source follower circuit is represented by Gsf, the potential change amount (amplitude) $\Delta V1$ of the potential V1 of the pixel output line 16 due to the transfer of the charge from the photoelectric conversion element PD to the floating diffusion FD is expressed by the following expression (1).

$$\Delta V1 = -Q \times Gsf/CFD \quad (1)$$

The potential change amount $\Delta V1$ is amplified by the amplifier 32 including the amplifier circuit 34, the input capacitor C0, and the feedback capacitor C1. At this time, the potential change amount (amplitude) $\Delta V2$ of the output potential of the amplifier 32 is expressed by the following expression (2). The output potential V2 of the amplifier 32 is represented by the following expression (3). The voltage amplification factor C0/C1 set in the amplifier 32 at this time is referred to as Gain1.

$$\Delta V2 = Q \times (Gsf/CFD) \times (C0/C1) \quad (2)$$

$$V2 = V0 + Q \times (Gsf/CFD) \times (C0/C1) \quad (3)$$

In the following description, a period from the transitions of the control signal PRES and the control signal of the switch S0 from the high level to the low level to the transition of the control signal PTX to the high level is referred to as a pixel noise level readout period. A period after the control signal PTX becomes high level is referred to as a pixel signal level readout period. A period during which the comparison unit 40 compares the pixel signal with the reference signal is referred to as a comparison period or an AD conversion period. The AD conversion period during the pixel noise level readout period is referred to as an NAD period TN1. The AD conversion period during the pixel signal level readout period is referred to as a SAD period TS1. A period from the start of the NAD period to the end of the SAD period is referred to as an AD conversion period T1 for one pixel.

The comparator 44 performs a comparison operation of comparing the potential level of the output signal of the amplifier 32 with the potential level of the reference signal. The comparator 44 outputs a pulse signal (latch signal) indicating a comparison result at a timing when the magnitude relationship between the potential level of the output signal of the amplifier 32 and the potential level of the reference signal is reversed.

The counter unit 54 starts counting the clock signal (clock pulse) in response to the start of the change in the potential level of the reference signal by the reference signal generation unit 46. At this time, the start of the change in the potential level of the reference signal and the start of the count of the counter unit 54 do not have to completely coincide with each other. For example, the count of the counter unit 54 may be started after a predetermined period of time has elapsed since the change of the potential level of the reference signal has started. When the latch signal is received from the comparator 44 during the NAD period TN1, the memory 52 holds the count value a indicated by the count signal supplied from the count signal line 56 at that time. Similarly, when the latch signal is received from the comparator 44 during the SAD period TS1, the memory 52 holds the count value b indicated by the count signal supplied from the count signal line 56 at that time. The count values a and b held in the memory 52 in this manner are AD conversion values (digital data) of the pixel signals. It is assumed that the memory 52 has a plurality of memories corresponding to the pixel noise level readout and the pixel signal level readout.

The count values held in the memory 52 are transferred to the digital signal processing unit 70 in response to a control signal from the horizontal scanning unit 60, and are output to the outside via the output unit 80 after the digital signal processing by the digital signal processing unit 70. An example of the digital signal processing in the digital signal processing unit 70 is a process of subtracting the AD conversion value a from the AD conversion value b. By performing the subtraction processing, the reset noise of the pixel 12, the offset difference and the fixed pattern noise generated in the plurality of amplifiers 32 and the plurality of comparators 44 including the pixel 12 can be removed, and the image quality can be improved.

Figure 5:
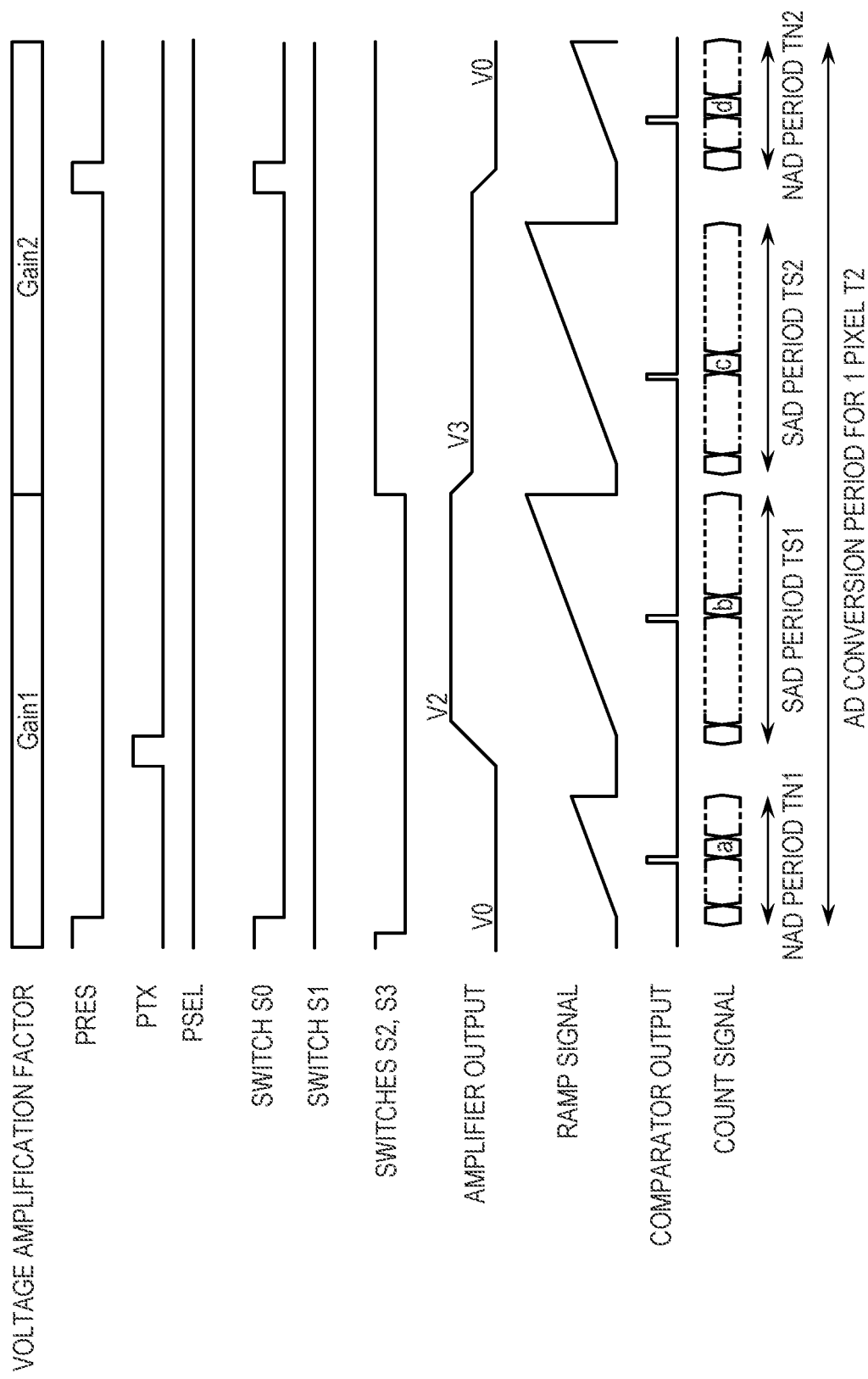

Next, another example of driving the photoelectric conversion device according to the present embodiment will be described with reference to FIG. 5. FIG. 5 is a timing chart illustrating a method of driving the photoelectric conversion device according to the present embodiment. FIG. 5 illustrates temporal changes of the voltage amplification factor of the amplifier 32, the control signals PRES, PTX, and PSEL, the control signals of the switches S0, S1, S2, and S3, the output signal of the amplifier 32, the ramp signal, the output signal of the comparator 44, and the count signal. It is assumed that the switches S0, S1, S2, and S3 are turned on when the corresponding control signal is at a high level, and are turned off when the corresponding control signal is at a low level.

The driving example of FIG. 5 is a standard driving example for expanding the dynamic range. That is, the driving example of FIG. 5 may be applied to the case of generating an image in which the dynamic range is enlarged by using signals obtained by amplifying at different voltage amplification factors. Specifically, the pixel signal is amplified by two kinds of amplification factors, i.e., a voltage amplification factor Gain1 and a voltage amplification factor Gain2, and the AD conversion is performed on each of the amplified pixel signals.

First, in the same manner as in the driving example of FIG. 4, processing up to the SAD period TS1 is executed to obtain the AD conversion value a and the AD conversion value b. The voltage amplification factor at this time is Gain1.

Next, the control signals of the switches S2 and S3 are shifted from the low level to the high level, and the switches S2 and S3 are turned on. Thereby, the feedback capacitance of the amplifier circuit 34 becomes (C1+C2+C3), and the voltage amplification factor of the amplifier 32 becomes C0/(C1+C2+C3). The voltage amplification factor at this time is Gain2. The output potential V3 of the amplifier 32 at this time is represented by the following expression (4).

$$V3 = V0 + Q \times (Gsf/CFD) \times (C0/(C1+C2+C3)) \quad (4)$$

Similarly to the SAD period TS1, the comparison unit 40 and the memory unit 50 perform AD conversion on the pixel signal amplified by the voltage amplification factor Gain2, and store the acquired AD conversion value in the memory 52. This period is referred to as an SAD period TS2. It is assumed that a count value c is held as an AD conversion value in the memory 52.

Next, the control signal PRES is shifted to the high level for a predetermined period of time to turn on the reset transistor M2, thereby resetting the floating diffusion FD. Further, the control signal of the switch S0 is shifted to the high level for a predetermined period of time to turn on the switch S0, thereby resetting the amplifier 32. Thereby, a pixel signal of a pixel noise level is output to the pixel output line 16, and a signal obtained by amplifying the pixel signal at the voltage amplification factor Gain2 is output to the amplified signal output line 36.

Similarly to the NAD period TN1, the comparison unit 40 and the memory unit 50 perform an AD conversion on the pixel signal of the pixel noise level amplified by the voltage amplification factor Gain2, and hold the acquired AD conversion value in the memory 52. This period is referred to as an NAD period TN2. It is assumed that a count value d is held as an AD conversion value in the memory 52.

Note that the AD conversion value obtained in the NAD period TN2 includes noise when the reset transistor M2 and the switch S0 are turned off, but this noise may not be the same as the noise included in the AD conversion value obtained in the NAD period TN1. The data obtained in the NAD period TN2 may be effective in removing offset or fixed pattern noise in digital signal processing in the digital signal processing unit 70.

Further, in this driving example, each of the memories 52 may have a plurality of memories corresponding to the NAD periods TN1 and TN2 and the SAD periods TS1 and TS2. Alternatively, the AD conversion values held in the AD conversion periods TN1 and TS1 may be transferred to and held in another memory, and a part of the memories after the AD conversion values are transferred may be used as a memory for holding the AD conversion values in the AD conversion periods TN2 and TS2. The data of the AD conversion periods TN1 and TS1 held in another memory may be horizontally transferred during the AD conversion periods TN2 and TS2.

In this driving example, a period from the start of the NAD period TN1 to the end of the NAD period TN2 is referred to as an AD conversion period T2 for one pixel. In this driving example, the order of the AD conversion is the AD conversion periods TN1, TS1, TS2, and TN2, but the configuration of the amplifier 32 may be changed to change the order of the AD conversion periods TN1, TN2, TS2, and TS1 or the AD conversion periods TN1, TN2, TS1, and TS2. In the present embodiment, the AD conversion period is a period from the start of the change of the potential to the end of the change of the potential of the reference signal. In another aspect, the AD conversion period is a period from the start of the counting operation to the end of the counting operation of the counter unit 54. In the drawing, the start of the change of the potential of the reference signal and the start of the counting operation of the counter unit 54 are simultaneously performed. Therefore, the period from the start of the change in the potential to the end of the change in the potential of the reference signal coincides with the period from the start of the counting operation to the end of the counting operation of the counter unit 54. However, the present invention is not limited to this example, and as described above, either the start to the end of the change in the potential of the reference signal or the start to the end of the counting operation of the counter unit 54 may be used as the AD conversion period. Although the AD conversion using the reference signal is described as an example in the present embodiment, the present invention is not limited to this example. For example, in the case of successive approximation AD conversion, the AD conversion period may be a period from the start to the end of a change in the potential of a reference signal compared with an analog signal.

The count values a, b, c, and d held in the memory 52 are transferred to the digital signal processing unit 70 in response to a control signal from the horizontal scanning unit 60, and are output to the outside via the output unit 80 after the digital signal processing by the digital signal processing unit 70.

Figure 6:
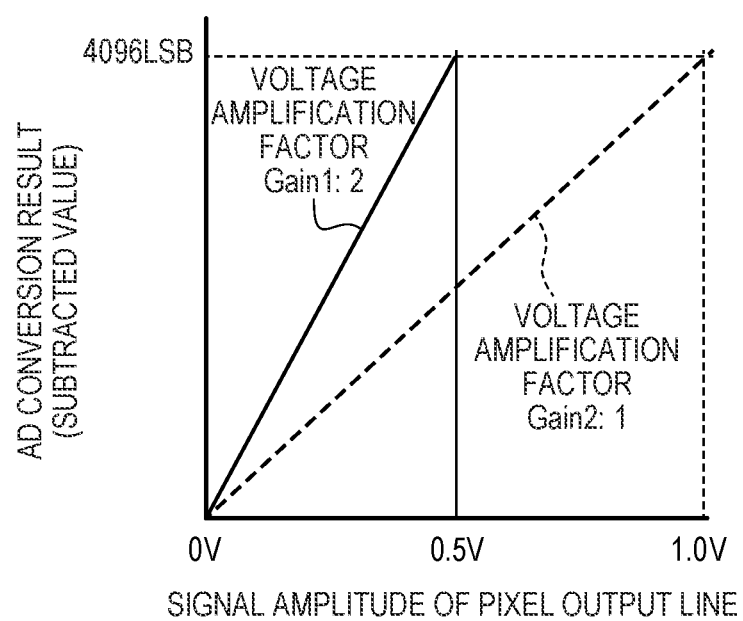
FIG. 6, FIG. 7 and FIG. 8 are graphs illustrating an example of a digital signal processing in a digital signal processing unit.
Figure 7:
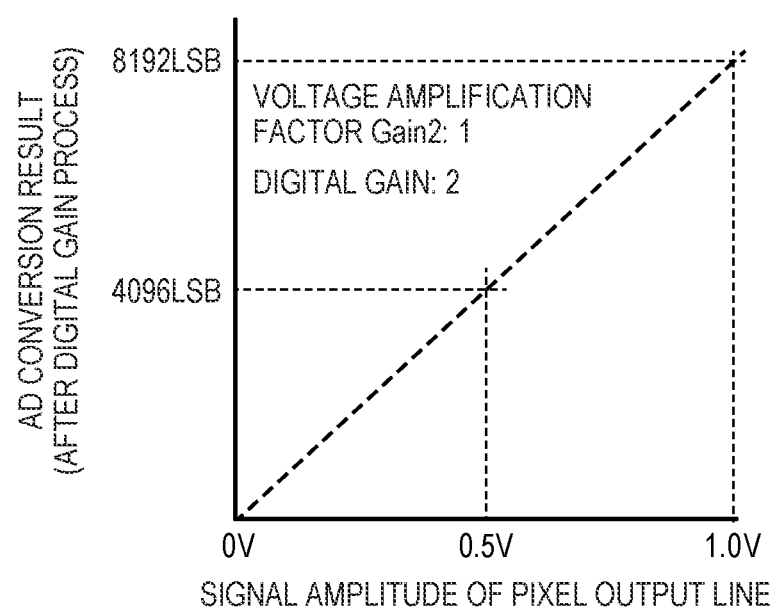
Figure 8:
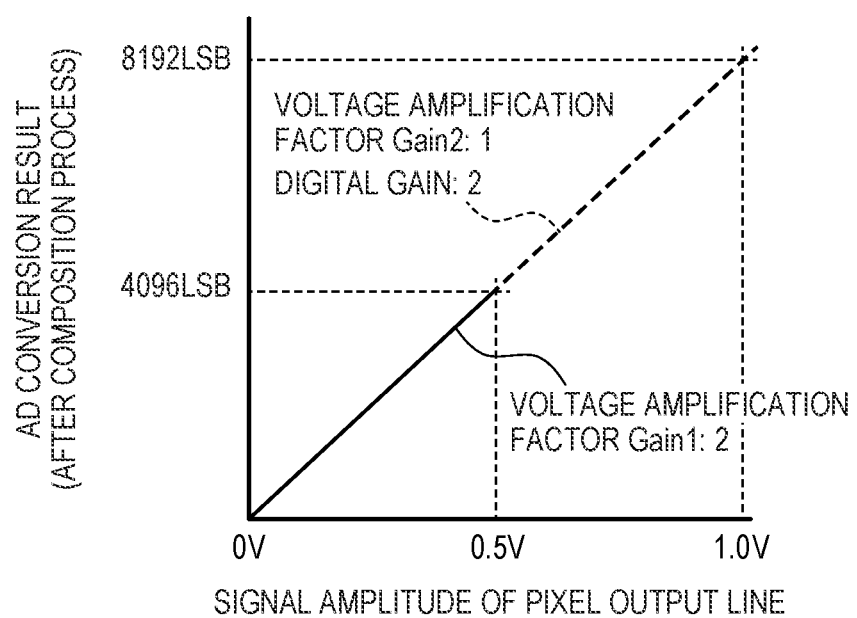

FIG. 6 to FIG. 8 are graphs for explaining an example of digital signal processing on the AD conversion value obtained in the driving example illustrated in FIG. 5.

FIG. 6 illustrates a result after subtraction processing in the digital signal processing unit 70. In FIG. 6, the horizontal axis represents the signal amplitude of the pixel output line 16 (potential change amount $\Delta V1$), and the vertical axis represents the result of subtracting the AD conversion value obtained in the NAD period from the AD conversion value obtained in the SAD period. Here, it is assumed that the maximum value of the potential change amount $\Delta V1$ of the pixel output line 16 based on the expression (1) is 1.0 V, and the maximum value of the difference between the AD conversion values obtained in the AD conversion periods TN1 and TS1 (hereinafter referred to as the AD conversion result) is 4096 LSB. That is, the resolution of the AD conversion is set to 12 bits. It is also assumed that the voltage amplification factor Gain1 is C0/C1=2, and the voltage amplification factor Gain2 is C0/(C1+C2+C3)=1.

The slope of the reference signal and the frequency of the counter are set such that the AD conversion result (c−d) becomes 4096 LSB when the voltage amplification factor is Gain2 (=1), the potential change amount $\Delta V1$ of the pixel output line 16 is 1.0 V, and the potential change amount $\Delta V2$ of the amplifier 32 is 1.0 V. This is illustrated by a broken line in FIG. 6. On the other hand, when the voltage amplification factor is Gain1 (=2) and the potential change amount $\Delta V1$ of the pixel output line 16 is 0.5 V, the potential change amount $\Delta V2$ of the amplifier 32 is 1.0 V, and the AD conversion result (b−a) is 4096 LSB. This is illustrated by a solid line in FIG. 6.

The graph of FIG. 6 shows that the amount of change in the AD conversion result with respect to the potential change of the pixel output line 16 varies depending on the voltage amplification factor of the amplifier 32. Specifically, when the voltage amplification factor is Gain1 (=2), the amount of change in the AD conversion result is twice that when the voltage amplification factor is Gain2 (=1).

FIG. 7 is a graph illustrating a result when a digital gain which is twice as large as the AD conversion result (c−d) (=(c−d)×2) is applied. When the voltage amplification factor is Gain2 (=1) and the potential change amount $\Delta V1$ of the pixel output line 16 is 0.5 V, a value obtained by multiplying the AD conversion result (c−d) by a digital gain (=(c−d)×2) is 4096 LSB. That is, the change amount of the AD conversion result with respect to the potential change amount $\Delta V1$ of the pixel output line 16 at this time is the same as the change amount of the AD conversion result (b−a) with respect to the potential change amount $\Delta V1$ of the pixel output line 16 when the voltage amplification factor is Gain1. At this time, the maximum value of the AD conversion value is 8192 LSB.

FIG. 8 is a graph illustrating a method of compositing an image using an AD conversion result (b−a) and an AD conversion result (c−d). As illustrated in FIG. 8, the AD conversion result (b−a) of the pixel signal amplified by the voltage amplification factor Gain1 is used as image data in a range (low luminance region) in which the potential change amount $\Delta V1$ of the pixel output line 16 is equal to or greater than 0 V and less than 0.5 V. In a range (high luminance region) where the potential change amount $\Delta V1$ of the pixel output line 16 is 0.5 V or more, the AD conversion result (c−d)×2 of the pixel signal amplified by the voltage amplification factor Gain2 is used as image data.

Since the voltage amplification factor Gain1 is higher than the voltage amplification factor Gain2, the AD conversion result (b−a) is more advantageous than the AD conversion result (c−d) in terms of an amount of noise at the post stage of the amplifier 32. On the other hand, since the AD conversion result (c−d) becomes 4096 LSB when the potential change amount $\Delta V1$ of the pixel output line 16 is 1.0 V at which the potential change amount $\Delta V1$ becomes the maximum, the AD conversion result (c−d) is more advantageous than the AD conversion result (b−a) in terms of the input dynamic range. Accordingly, the image composited as illustrated in FIG. 8 becomes an image in which the dynamic range is enlarged while the S/N ratio is improved.

On the other hand, since the NAD period TN1 and the NAD period TN2, and the SAD period TS1 and the SAD period TS2 require the same processing time, the processing time of the AD conversion period T2 for one pixel is twice as long as that of the AD conversion period T1 for one pixel described with reference to FIG. 4. Therefore, in the driving example of FIG. 5, the readout time is long, and the frame rate is reduced.

As another method for obtaining an image in which the dynamic range is enlarged by using two AD conversion results obtained at different voltage amplification factors, it is conceivable to provide two or more signal processing circuits at the post stage of the amplifier 32, and simultaneously process the same pixel signal in these signal processing circuits. According to this configuration example, although the readout time can be shortened, the image quality may be degraded due to an offset caused by errors in two or more signal processing circuits, for example, an error in the voltage amplification factor or an error in the operating point of the amplifier 32. Further, the circuit size becomes large, which may be disadvantageous from the viewpoint of the chip size and the allowable current amount of the power supply.

Figure 9:
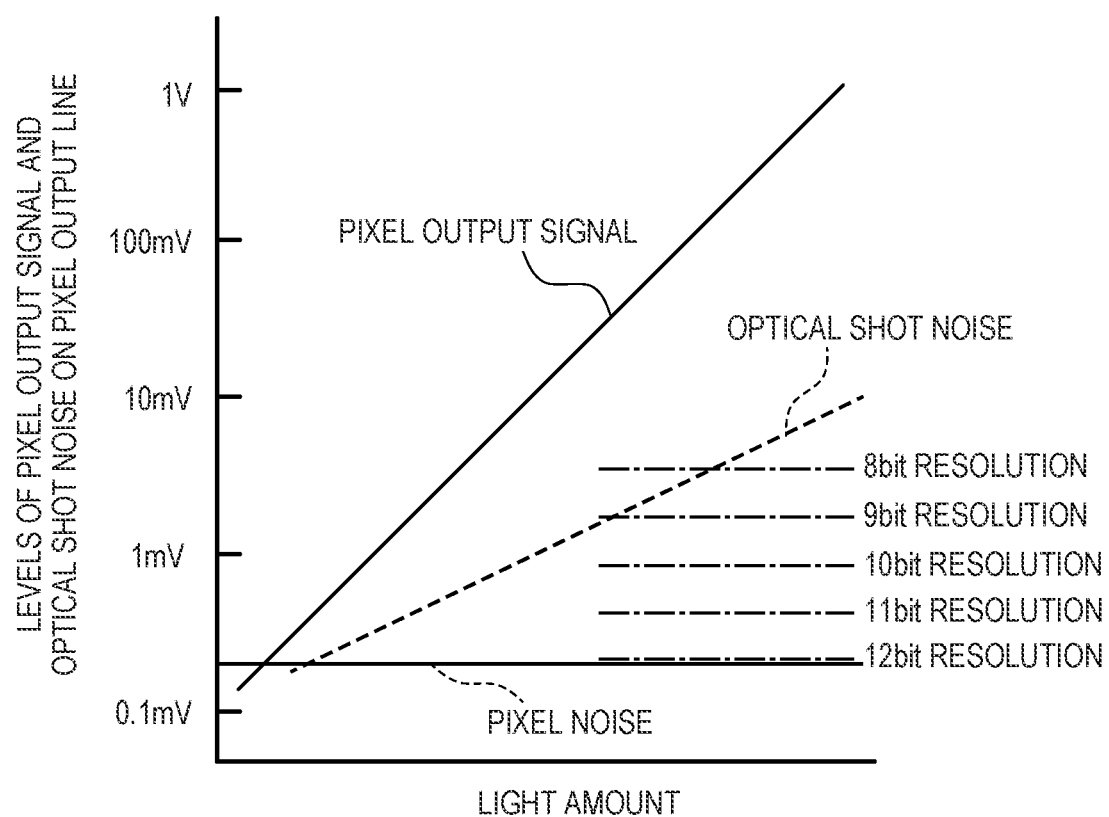
FIG. 9 is a graph illustrating a relationship between an amount of incident light, and a pixel output signal and optical shot noise.

FIG. 9 is a graph explaining the S/N ratio of pixel signals in the digital signal processing described with reference to FIG. 6 to FIG. 8. In FIG. 9, the horizontal axis represents an amount of incident light to the pixel 12, and the vertical axis represents the signal level (pixel output signal) photoelectrically converted according to the incident light and optical shot noise on the logarithmic axis. In FIG. 9, the solid line indicates the relationship between the amount of incident light and the pixel output signal. The broken line indicates the relationship between the amount of incident light and the optical shot noise. The dotted line indicates pixel noise (This includes noise caused by the amplifier 32. No noise due to AD conversion is included.).

Assuming that the pixel noise is 0.2 mV, the S/N ratio expressed as the ratio between the signal level of 1.0 V and the pixel-based noise of 0.2 mV is 74 dB. Considering the quantization bit error, in order to perform AD conversion on the pixel signal with covering this S/N ratio, resolution higher than 12 bits is required for AD conversion.

Next, the relationship between the pixel signal and the optical shot noise will be described. Here, it is assumed that the number N of photoinduced charges at the signal level of 1.0 V is 10,000. The amount of noise of the optical shot noise is generally expressed as $\sqrt{N}$ (square root of N). When the large amplitude signal level of the pixel signal is 1.0 V, the number of optical shot noises for 10,000 photoinduced charges is 100, and the S/N ratio at this time is 40 dB. When the small amplitude signal level is 10 mV, the S/N ratio at this time is 20 dB. In other words, it can be understood that the resolution for ensuring the S/N ratio of above 40 dB is sufficient at any point of the signal level.

In FIG. 9, the resolutions in the AD conversion from 8 bits to 12 bits are indicated by a one-dot-chain line. As illustrated in FIG. 9, depending on an amount of light, the resolution of the AD conversion can be set low while considering the optical shot noise and the quantization error. In the digital signal processing described with reference to FIG. 6 to FIG. 8, by applying a digital gain twice to the AD conversion value of the pixel signal amplified by the voltage amplification factor Gain2 (=1), the resolution becomes half, equivalent to 11 bits. As described with reference to FIG. 9, in a range in which the potential change amount $\Delta V1$ of the pixel output line 16 is 0.5 V or more, even if the resolution becomes 11 bits, there is no influence on the image quality.

Figure 10:
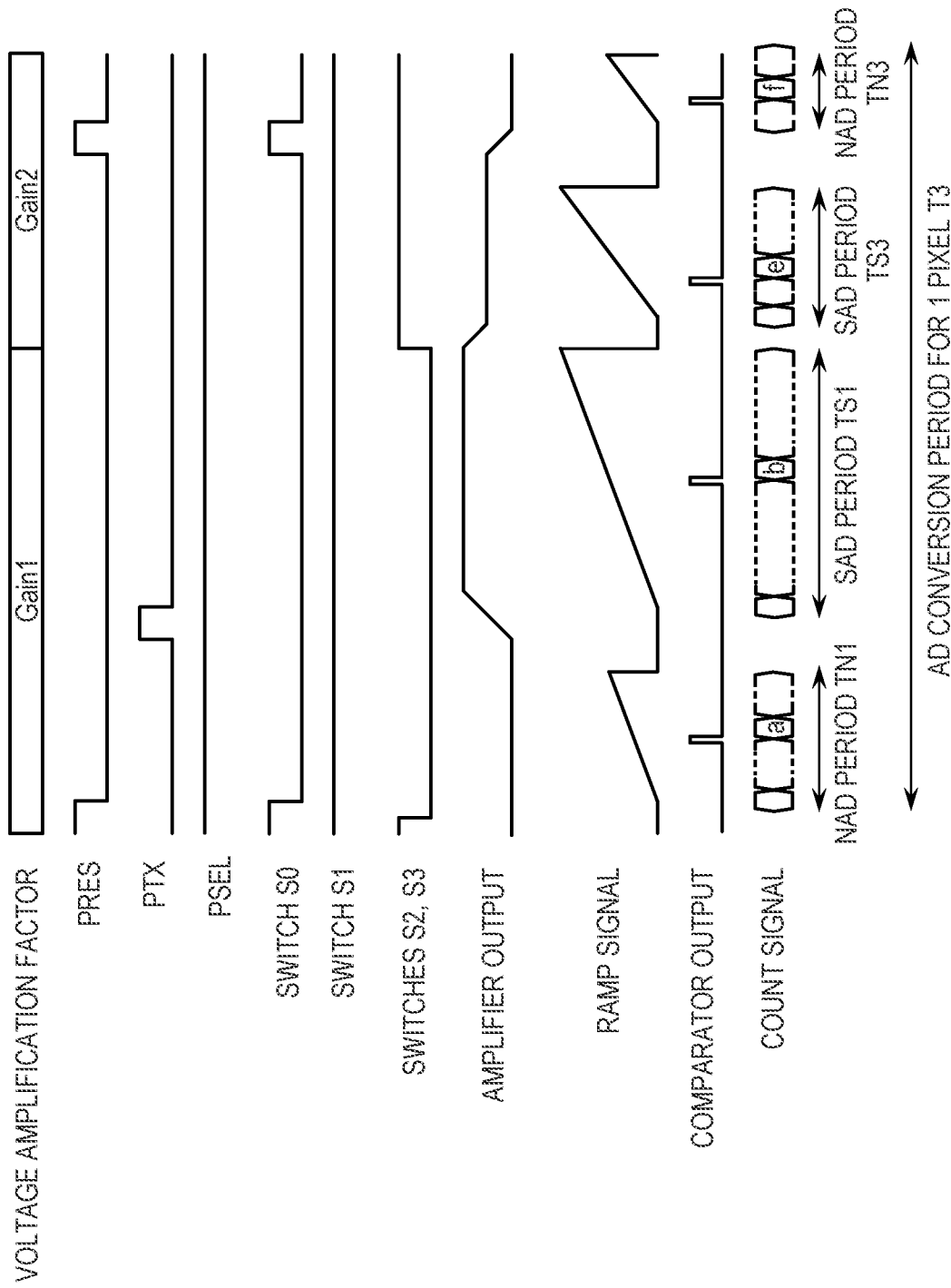
FIG. 10 and FIG. 14 are timing charts illustrating a method of driving the photoelectric conversion device according to the first embodiment of the present invention.

FIG. 10 is a timing chart illustrating a driving method in a case where the speed of readout is increased as compared with the driving example of FIG. 5. FIG. 10 illustrates temporal changes of the voltage amplification factor of the amplifier 32, the control signals PRES, PTX, and PSEL, the control signals of the switches S0, 51, S2, and S3, the output signal of the amplifier 32, the ramp signal, the output signal of the comparator 44, and the count signal.

In this driving example, in the SAD period TS3 and the NAD period TN3, the change rate of the reference signal generated by the reference signal generation unit 46 with respect to time is doubled. Thus, the maximum value (1.0 V) of the potential change amount ΔV1 of the pixel output line 16 can be compared during a time of one half of the SAD period TS2 in FIG. 5.

In FIG. 10, a period in which the SAD period TS2 is shortened to ½ is defined as the SAD period TS3, and a period in which the NAD period TN2 is shortened to ½ is defined as the NAD period TN3. By shortening the SAD period TS3 and the NAD period TN3 in this manner, the AD conversion period T3 for one pixel can be shortened to ¾ of the AD conversion period T2 for one pixel in FIG. 5. In the driving example of FIG. 10, the count value e is held in the memory 52 in the SAD period TS3, and the count value f is held in the memory 52 in the NAD period TN3.

Figure 11:
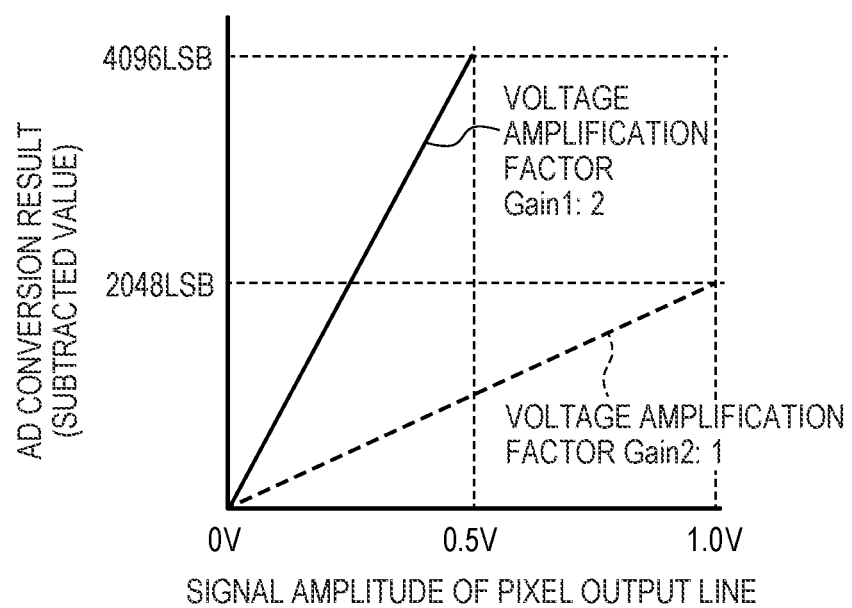
FIG. 11, FIG. 12 and FIG. 13 are graphs illustrating an example of a digital signal processing in the method of driving the photoelectric conversion device according to the first embodiment of the present invention.
Figure 12:
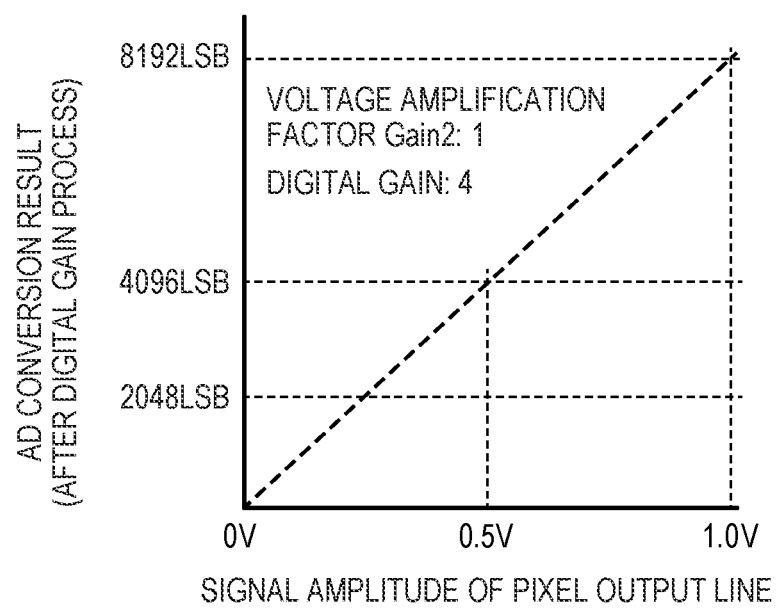
Figure 13:
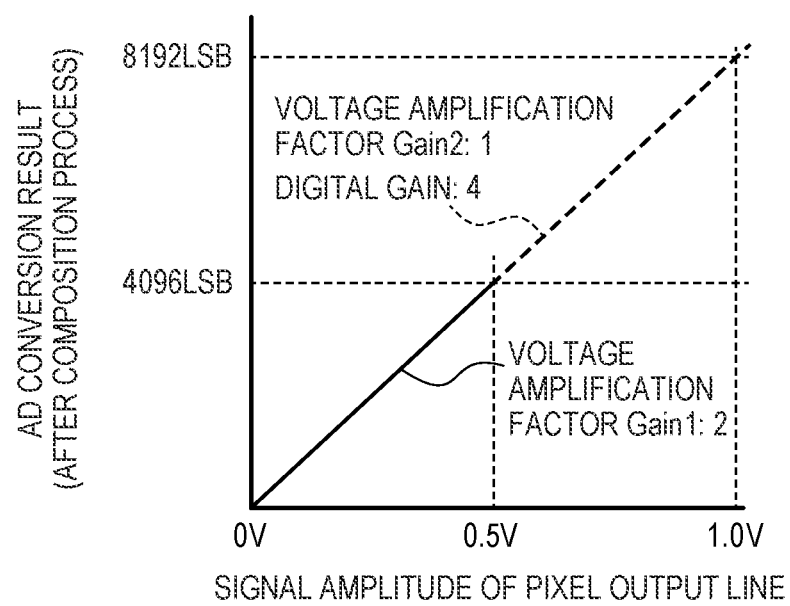

FIG. 11 to FIG. 13 are graphs for explaining an example of digital signal processing on the AD conversion value obtained in the driving example illustrated in FIG. 10.

FIG. 11 illustrates a result after subtraction processing in the digital signal processing unit 70. In FIG. 11, the horizontal axis represents the signal amplitude of the pixel output line 16 (potential change amount ΔV1), and the vertical axis represents the result of subtracting the AD conversion value obtained in the NAD period from the AD conversion value obtained in the SAD period. Here, as in the case of FIG. 6, it is assumed that the voltage amplification factor Gain1 is C0/C1=2, and the voltage amplification factor Gain2 is C0/(C1+C2+C3)=1.

In FIG. 11, a solid line indicates a signal corresponding to the voltage amplification factor Gain1, and when the potential change amount ΔV1 of the pixel output line 16 is 0.5 V, the potential change amount ΔV2 of the amplifier 32 is 1.0 V, and the AD conversion result (b−a) is 4096 LSB. The broken line indicates a signal corresponding to the voltage amplification factor Gain2. As described above, when the voltage amplification factor of the amplifier 32 is Gain2 (=1), since the reference signal has a change amount twice the time, the time required for the AD conversion is ½. That is, when the potential change amount ΔV1 of the pixel output line 16 is 1.0 V, the AD conversion result (e−f) becomes 2048 LSB. That is, the amount of change in the AD conversion result when the voltage amplification factor is Gain1 (=2) is four times the amount of change in the AD conversion result when the voltage amplification factor is Gain2 (=1).

FIG. 12 is a graph illustrating a result when a digital gain which is four times as large as the AD conversion result (e−f) (=(e−f)×4) is applied. When the voltage amplification factor is Gain2 (=1) and the potential change amount ΔV1 of the pixel output line 16 is 0.5 V, a value obtained by multiplying the AD conversion result (e−f) by a 4-fold digital gain (=(e−f)×4) is 4096 LSB. That is, the change amount of the AD conversion result with respect to the potential change amount ΔV1 of the pixel output line 16 at this time is the same as the change amount of the AD conversion result (b−a) with respect to the potential change amount ΔV1 of the pixel output line 16 when the voltage amplification factor is Gain1. At this time, the maximum value of the AD conversion value is 8192 LSB.

FIG. 13 is a graph explaining a method of compositing an image using an AD conversion result (b−a) and an AD conversion result (e−f). As illustrated in FIG. 13, in a range (low luminance region) where the potential change amount ΔV1 of the pixel output line 16 is equal to or greater than 0 V and less than 0.5 V, the AD conversion result (b−a) with the voltage amplification factor of Gain1 is used as image data. In a range (high luminance region) where the potential change amount ΔV1 of the pixel output line 16 is 0.5 V or more, the AD conversion result (e−f)×4 with the voltage amplification factor of Gain2 is used as image data.

In the driving example of FIG. 10, in the comparison operation of the SAD period TS3 and the NAD period TN3, since an amount of change of the level of the reference signal with respect to time is set to double, the resolution becomes ½. Further, by setting the digital gain to four times, the resolution becomes ¼. Therefore, although the resolution in the high luminance region of FIG. 13 becomes ⅛, the resolution does not affect the image quality even when the resolution becomes ⅛ because the optical shot noise is large in the high luminance region in which the potential change amount of the pixel output line 16 is 0.5 V or more, as described with reference to FIG. 9. That is, also in the driving example of FIG. 10, an image in which the dynamic range is enlarged can be obtained while the S/N ratio is improved. In addition, since the length of the SAD period TS3 and the length of the NAD period TN3 in which the voltage amplification factor is Gain2 (=1) may be reduced to ½, the readout time becomes shorter than that in the driving example of FIG. 5, and a decrease in the frame rate may be suppressed.

In the driving example of FIG. 10, although a signal amplified by the voltage amplification factor Gain1 and a signal amplified by the voltage amplification factor Gain2 are obtained for the same pixel signal from the viewpoint of obtaining an image in which the dynamic range is enlarged, a plurality of signals amplified with the same voltage amplification factor may be acquired.

Figure 14:
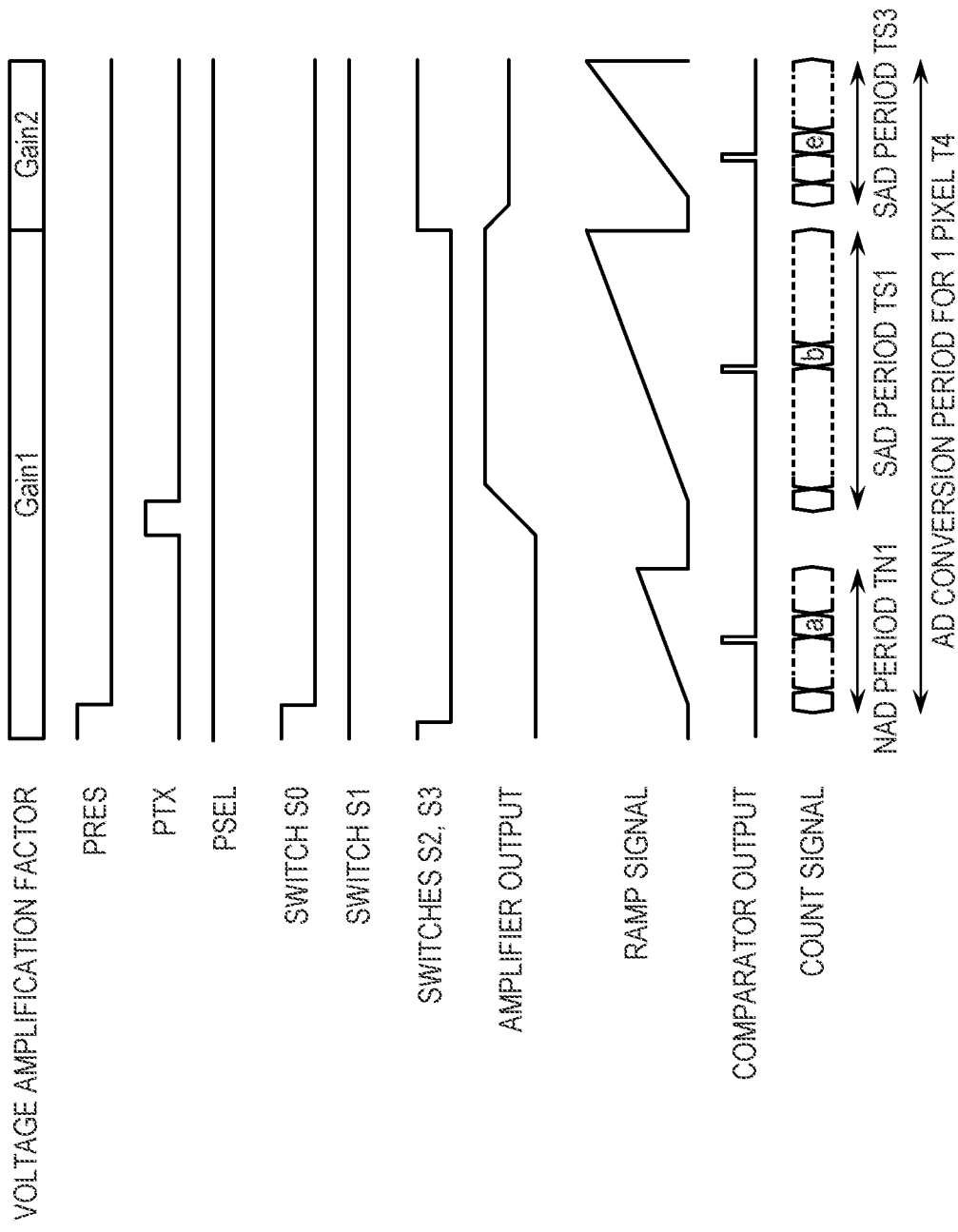

FIG. 14 is a timing chart illustrating another driving method in the case where the speed of readout is increased as compared with the driving example of FIG. 5. FIG. 14 illustrates temporal changes of the voltage amplification factor of the amplifier 32, the control signals PRES, PTX, and PSEL, the control signals of the switches S0, 51, S2, and S3, the output signal of the amplifier 32, the ramp signal, the output signal of the comparator 44, and the count signal. In this driving example, the NAD period TN3 in the driving example of FIG. 10 is omitted.

The AD conversion value f obtained in the NAD period TN3 in the driving example of FIG. 10 is subtracted from the AD conversion value e obtained in the SAD period TS3, and is used for subtracting offset and fixed pattern noise. On the other hand, in this driving example, since the NAD period TN3 is omitted, the AD conversion value f is not acquired. Here, the AD conversion value f obtained in the NAD period TN3 of FIG. 10 is approximately Gain2/Gain1 with respect to the AD conversion value a obtained in the NAD period TN1 except for some noise components.

As described with reference to FIG. 13, in a range in which the potential change amount of the pixel output line 16 is 0.5 V or more, data of the AD conversion value (e−f)×4 when the voltage amplification factor is Gain2 is used as an image. In this range, the level of the optical shot noise is large, and even if the AD conversion value f obtained in the NAD period TN3 of FIG. 10 is replaced with the AD conversion value a×Gain2/Gain1, the image quality may not be affected. Therefore, in the driving example of FIG. 14, the digital signal processing unit 70 calculates the AD conversion value a×Gain2/Gain1 and performs a process of subtracting the AD conversion value a×Gain2/Gain1 from the AD conversion value e. In the driving example of FIG. 14, the AD conversion period T4 for one pixel may be further shortened as compared with the AD conversion period T3 for one pixel in the driving example of FIG. 10.

As described with reference to FIG. 8 and FIG. 13, in the case where AD conversion results of different voltage amplification factors are used with a certain luminance (potential change amount of the pixel output line 16) as a boundary, an error of the voltage amplification factor may occur even in the same signal processing path. This is due to an offset at a boundary between the low luminance region and the high luminance region or an error in linearity between the low luminance region and the high luminance region, and may affect image quality. In such a case, an image may be corrected by acquiring AD conversion values of different voltage amplification factors in a range in which the potential change amount of the pixel output line 16 is less than 0.5 V, and processing these signals to calculate correction values of offset and linearity.

For example, the offset is calculated by subtracting the AD conversion values obtained at different voltage amplification factors, and the correction processing is performed. Alternatively, the image data may be obtained by averaging the AD conversion values obtained at different voltage amplification factors. Also in a photoelectric conversion device configured to process signals generated by a plurality of photoelectric conversion elements to detect a phase difference, AD conversion values obtained at different voltage amplification factors in a range in which the potential change amount of the pixel output line 16 is less than 0.5 V may be used. For example, a suitable processing result (phase difference detection signal) may be obtained by selecting and processing any one of AD converted values obtained at different voltage amplification factors for signals generated by a plurality of photoelectric conversion elements or performing averaging processing.

Further, as in the driving example of the present embodiment, when the AD conversion result is selected according to the level of the pixel signal among the plurality of AD conversion results and used as an image signal, the amount of data horizontally transferred from the memory unit 50 or the amount of signal processing data of the digital signal processing unit 70 may be adjusted.

For example, as the AD conversion result (c–d) obtained in the SAD period TS2 and the NAD period TN2 in the driving example of FIG. 5, data less than 2048 LSB is not used. Therefore, several bits on the lower side may not be horizontally transferred from the memory unit 50 according to the required resolution. Alternatively, several bits on the lower side may be invalidated during signal processing in the digital signal processing unit 70.

On the other hand, as for the AD conversion result (e–f) obtained in the SAD period TS3 and the NAD period TN3 in the driving example of FIG. 10, since data of 2048 LSB or more is not used, the most significant bit may not be horizontally transferred from the memory unit 50. Alternatively, it may be invalid at the time of signal processing of the digital signal processing unit 70. In the driving example of the present embodiment, power consumption may be reduced by reducing the data amount of horizontal transfer and signal processing according to the resolution and the required range of the AD conversion value.

Further, as described with reference to FIG. 7 and FIG. 12, when digital gain processing is performed by the digital signal processing unit 70, the bit width of the AD conversion value increases. In this case, a decrease in the readout speed may be suppressed by increasing the operating frequency of the output unit 80. Alternatively, the digital signal processing unit 70 may be configured to compress the data after various signal processing and to output to the output unit 80.

The numeral values of the setting values of the plurality of voltage amplification factors, the ratio of the voltage amplification factors, the resolution of the AD conversion operation, the charge-voltage conversion ratio of the pixel, the optical shot noise, and the pixel noise described in the present embodiment are examples, and the settings may be appropriately changed in accordance with the concept of the S/N ratio described with reference to FIG. 9.

As described above, in the present embodiment, in the configuration in which AD conversion processing is performed on the pixel signals amplified at a plurality of different voltage amplification factors, the AD conversion period of the pixel signals amplified at some voltage amplification factors is shortened. Therefore, according to the present embodiment, it is possible to obtain an image in which a dynamic range is enlarged with a high S/N ratio while suppressing a reduction in frame rate.

Second Embodiment

Figure 15:
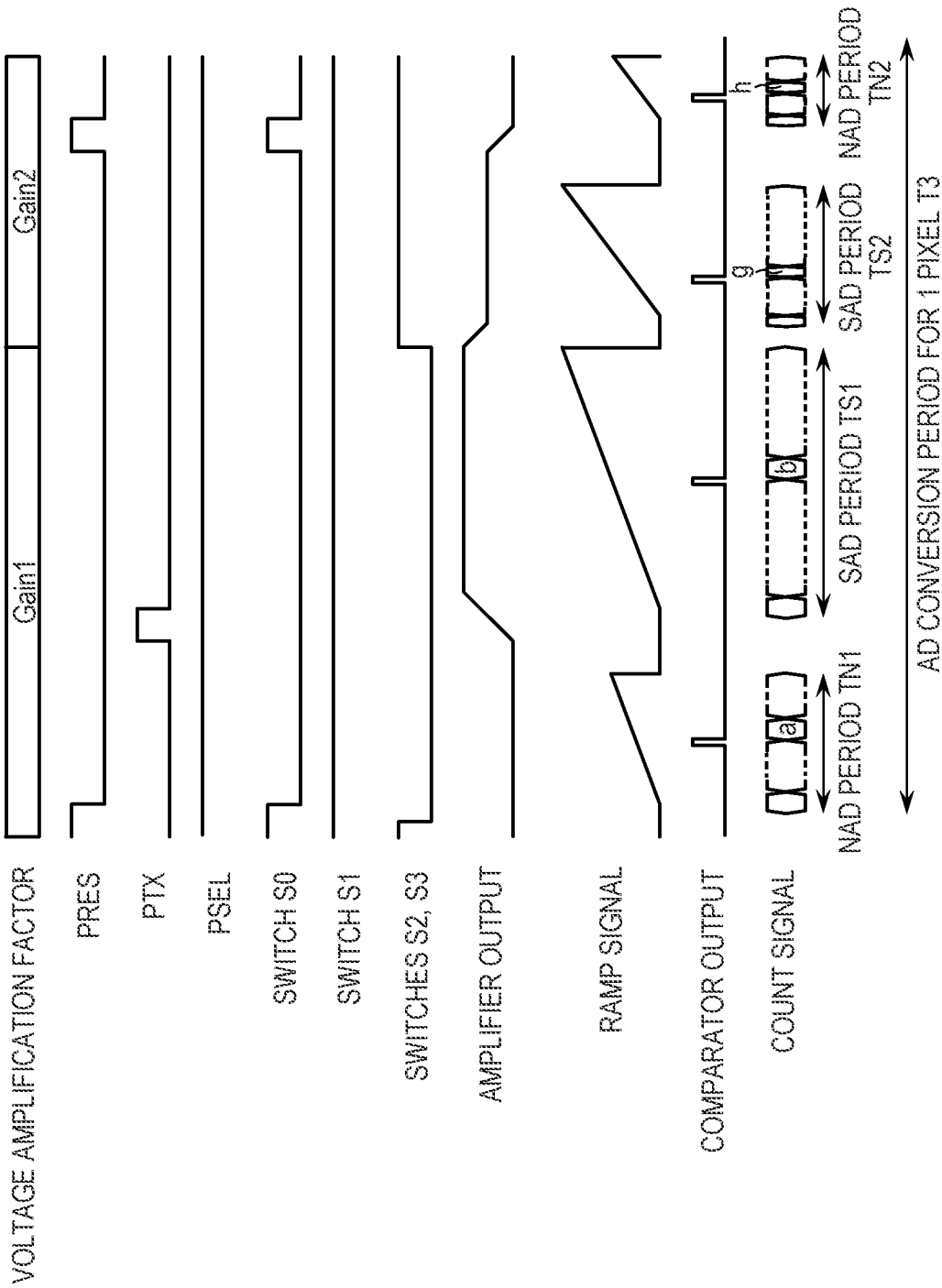
FIG. 15 is a timing chart illustrating a method of driving a photoelectric conversion device according to a second embodiment of the present invention.

A method of driving a photoelectric conversion device according to a second embodiment of the present invention will be described with reference to FIG. 15. Components similar to those of the photoelectric conversion device according to the first embodiment are denoted by the same reference numerals, and description thereof will be omitted or simplified.

In the present embodiment, another driving method of the photoelectric conversion device described in the first embodiment will be described. FIG. 15 is a timing chart illustrating a method of driving the photoelectric conversion device according to the present embodiment. FIG. 15 illustrates temporal changes of the voltage amplification factor of the amplifier 32, the control signals PRES, PTX, and PSEL, the control signals of the switches S0, S1, S2, and S3, the output signal of the amplifier 32, the ramp signal, the output signal of the comparator 44, and the count signal.

In the driving method of the present embodiment, the frequency of the count signal generated by the counter unit 54 in the AD conversion period for the pixel signal amplified by the voltage amplification factor Gain2 is set to be higher than that in the case of the method of driving the photoelectric conversion device according to the first embodiment illustrated in FIG. 10. Specifically, in the present embodiment, the frequency of the count signal in the SAD period TS2 and the NAD period TN2 is set to twice the frequency in the case of the driving example of FIG. 10. In this specification, the frequency of the counter and the frequency of the count signal are frequencies at which the count value indicated by the count signal transits.

In the driving method of the present embodiment, as in the case of the driving method illustrated in FIG. 10, the change amount of the reference signal with respect to time in the SAD period TS2 and the NAD period TN2 is set to twice the change amount of the reference signal with respect to time in the NAD period TN1 and the SAD period TS1. When the change amount of the reference signal with respect to time is set to twice, the AD conversion period may be shortened, but the resolution of the AD conversion decreases to ½. However, since the frequency of the counter is set to double in the present embodiment, even when the conversion amount of the reference signal with respect to time is set to twice, the same AD conversion result as in the case of the driving example of FIG. 5 may be obtained with respect to the potential change amount of the pixel output line 16.

Examples of the configuration of the counter unit 54 include a PLL (Phase Locked Loop) circuit and a counter circuit driven by a clock output from the PLL circuit. In such a configuration, the frequency of the counter may be changed by switching the multiplication number of the output clock of the PLL circuit. Alternatively, clocks input to the counter circuit may be switched by providing a plurality of PLL circuits having different frequencies of clocks to be generated. With such a configuration, there is no need to secure a stable time associated with switching of the multiplication number, and the processing time may be shortened.

In the present embodiment, using such a configuration, the count value g is acquired and held in the memory 52 in the SAD period TS2, and the count value h is acquired and held in the memory 52 in the NAD period TN2. The count values g and h acquired in this manner are equivalent to the count values c and d obtained in the driving example of FIG. 5, if the influence of noise is nothing.

In the driving example of FIG. 10, the resolution of the AD conversion result in the high luminance region decreases as the change amount of the reference signal with respect to time increases. For example, it is assumed that the ratio of the voltage amplification factor is large, such as the voltage amplification factor Gain1 (=4) and the voltage amplification factor Gain2 (=1). In this case, the range in which the AD conversion value of the pixel signal amplified by the voltage amplification factor Gain2 is used as an image is a range in which the potential change amount of the pixel output line 16 is 0.25 V or more, and shifts to the low luminance side. That is, since the optical shot noise described with reference to FIG. 9 is shifted to a small region, it is necessary to suppress a decrease in resolution of the AD conversion. On the other hand, when the count signal becomes a high frequency, for example, the influence of power supply noise or clock jitter appears in the comparison operation, which may affect the image quality. Therefore, it may be desirable to set the frequency of the count signal to be lower in the low luminance region where the optical shot noise is small and to increase the frequency of the count signal in the high luminance region where the optical shot noise is large.

As described above, according to the present embodiment, it is possible to obtain an image in which a dynamic range is enlarged with a high S/N ratio while suppressing a reduction in resolution of AD conversion and frame rate.

Third Embodiment

Figure 16:
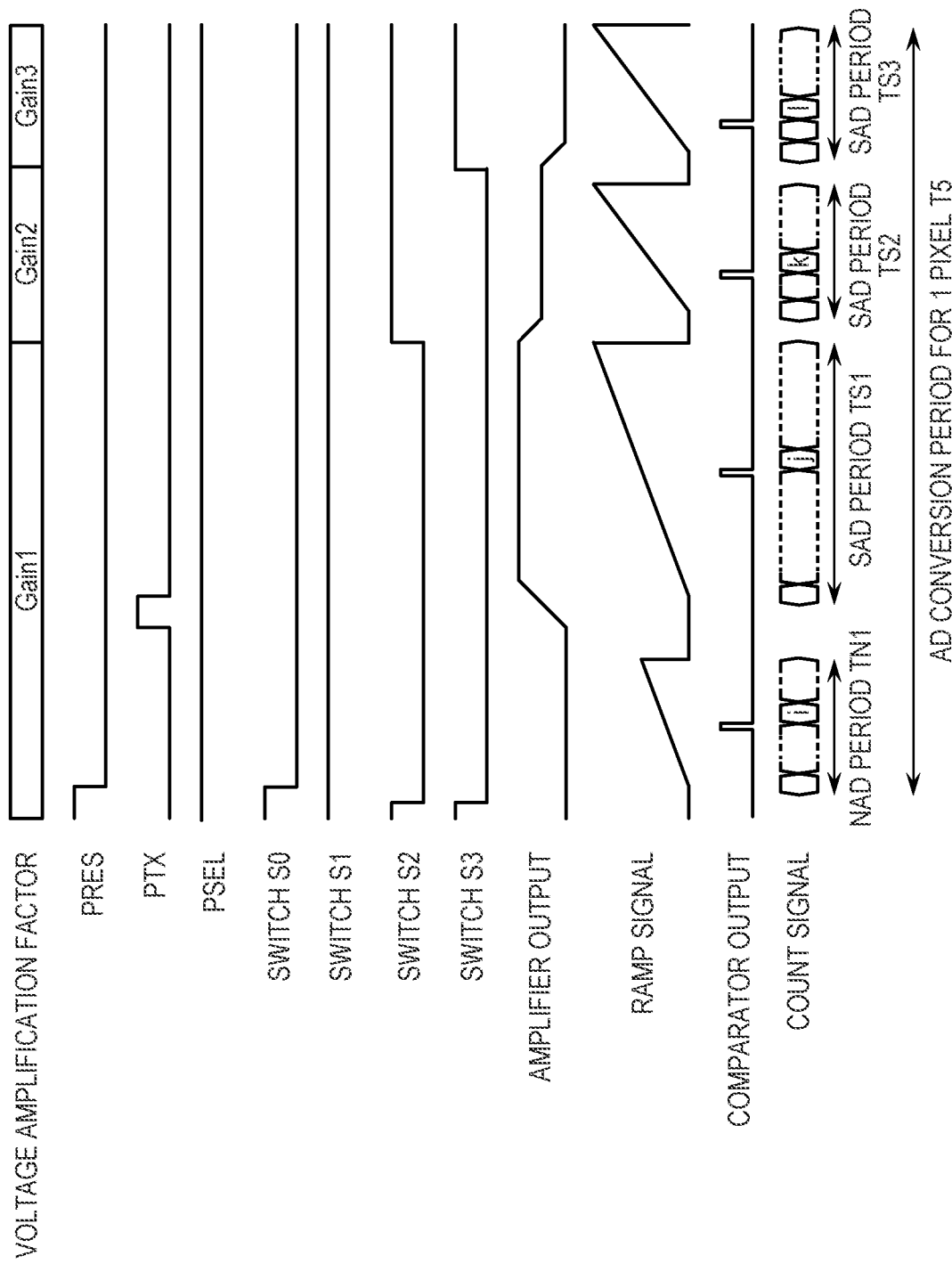
FIG. 16 is a timing chart illustrating a method of driving a photoelectric conversion device according to a third embodiment of the present invention.
Figure 17:
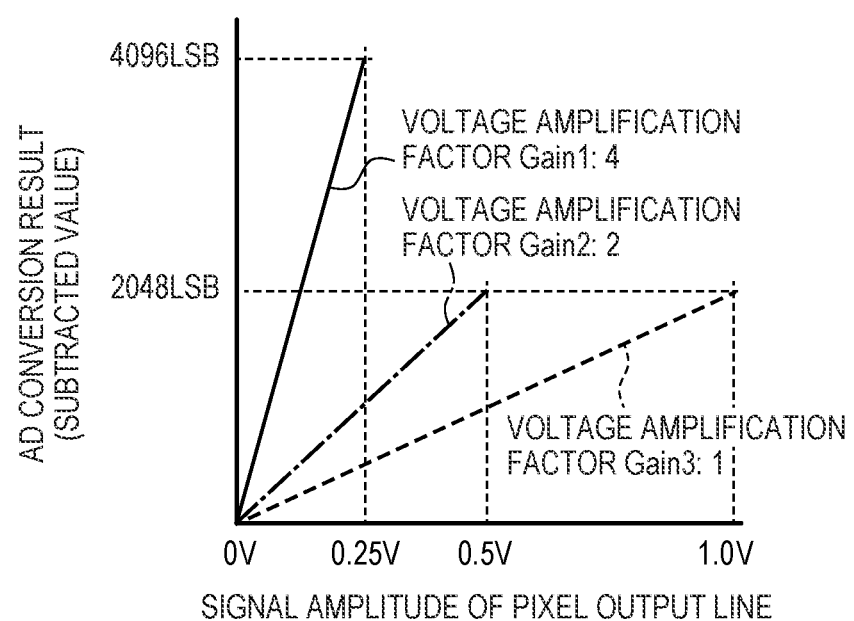
FIG. 17 and FIG. 18 are graphs illustrating an example of a digital signal processing in the method of driving the photoelectric conversion device according to the third embodiment of the present invention.
Figure 18:
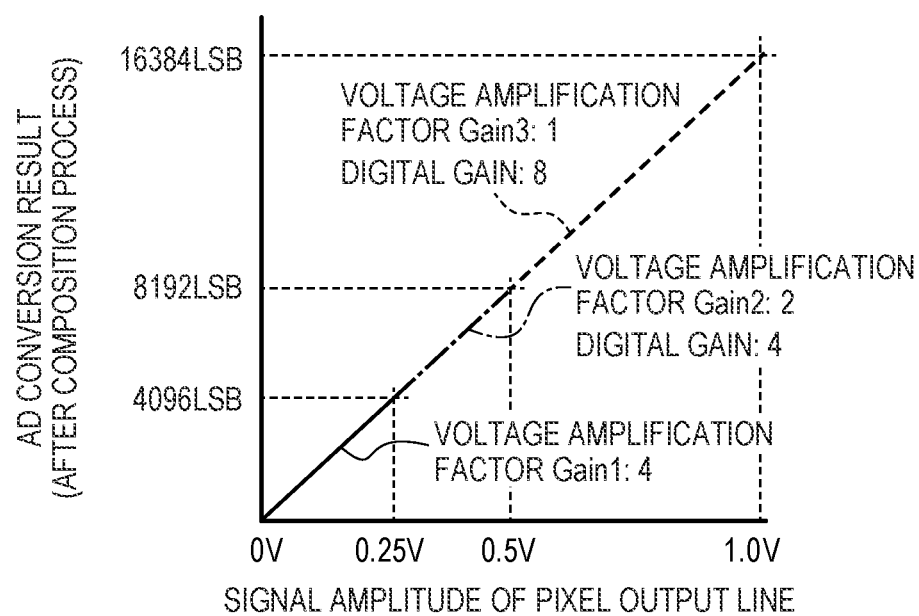

A method of driving a photoelectric conversion device according to a third embodiment of the present invention will be described with reference to FIG. 16 to FIG. 18. FIG. 16 is a timing chart illustrating a method of driving the photoelectric conversion device according to the present embodiment. FIG. 17 and FIG. 18 are graphs for explaining an example of digital signal processing on the AD conversion value. Components similar to those of the photoelectric conversion devices according to the first and second embodiments are denoted by the same reference numerals, and description thereof will be omitted or simplified.

In the present embodiment, another driving method of the photoelectric conversion device described in the first embodiment will be described. FIG. 16 illustrates temporal changes of the voltage amplification factor of the amplifier 32, the control signals PRES, PTX, and PSEL, the control signals of the switches S0, 51, S2, and S3, the output signal of the amplifier 32, the ramp signal, the output signal of the comparator 44, and the count signal.

In the driving method of the present embodiment, a period (SAD period TS3) in which the AD conversion of the pixel signal amplified by the voltage amplification factor Gain3 is performed is added to the driving example of FIG. 14. In the present embodiment, a case where the voltage amplification factor Gain1 is C0/C1=4, the voltage amplification factor Gain2 is C0/(C1+C2)=2, and the voltage amplification factor Gain3 is C0/(C1+C2+C3)=1 will be described as an example.

Corresponding to each voltage amplification factor, the AD conversion periods of the pixel signal amplified by the voltage amplification factor Gain1 are defined as an NAD period TN1 and an SAD period TS1. Further, the AD conversion period of the pixel signal amplified at the voltage amplification factor Gain2 is the SAD period TS2, and the AD conversion period of the pixel signal amplified at the voltage amplification factor Gain3 is the SAD period TS3. The amount of change of the level of the reference signal with respect to time in the SAD period TS2 and the SAD period TS3 is set to twice the amount of change of the level of the reference signal with respect to time in the SAD period TS1. In each AD conversion period, count values i, j, k, and l are held in the memory 52, as illustrated in FIG. 16.

In FIG. 17, the AD conversion result of the pixel signal amplified at the voltage amplification factor Gain1 is indicated by a solid line, the AD conversion result of the pixel signal amplified at the voltage amplification factor Gain2 is indicated by a one-dot chain line, and the AD conversion result of the pixel signal amplified at the voltage amplification factor Gain3 is indicated by a broken line.

FIG. 18 is a graph illustrating a method of multiplying a predetermined digital gain to an AD conversion result of a pixel signal amplified at each voltage amplification factor and compositing the result as an image. The AD conversion result of the pixel signal amplified by the voltage amplification factor Gain2 becomes the same as the slope in the case of the voltage amplification factor Gain1 by applying a digital gain of 4 times. The AD conversion result of the pixel signal amplified by the voltage amplification factor Gain3 becomes the same as the slope in the case of the voltage amplification factor Gain1 by applying a digital gain of 8 times.

In a region where the potential change amount of the pixel output line 16 is less than 0.25 V, the AD conversion result of the pixel signal amplified by the voltage amplification factor Gain1 is set as an image signal. In a region where the potential change amount of the pixel output line 16 is 0.25 V or more and less than 0.5 V, the AD conversion result of the pixel signal amplified by the voltage amplification factor Gain2 is used as an image signal. In a region where the potential change amount of the pixel output line 16 is 0.5 V or more, the AD conversion result of the pixel signal amplified by the voltage amplification factor Gain3 is used as an image signal. The AD conversion results of the pixel signal amplified by the voltage amplification factor Gain2 and the voltage amplification factor Gain3 may be obtained by multiplying the AD conversion value i obtained in the NAD period TN1 by the ratio of each voltage amplification factor and subtracting it from the AD conversion values k and l.

In order to improve the S/N ratio, if the voltage amplification factor on the low luminance side is increased and the ratio between different voltage amplification factors is increased, the resolution of the AD conversion value on the high luminance side cannot be lowered. Therefore, in the present embodiment, three kinds of voltage amplification factors Gain1, Gain2, and Gain3 are set, and the optimum voltage amplification factor and resolution can be set for each luminance. In the present embodiment, three types of voltage amplification factors Gain1, Gain2, and Gain3 are set, but the set values of the voltage amplification factors are not limited to three types, and may be four or more types.

In the SAD periods TS2 and TS3, it is possible to adjust the amount of change of the level of the reference signal with respect to time or the frequency of the counter. For example, the frequency of the counter is doubled in the period of the SAD period TS2, and the change amount of the level of the reference signal with respect to time is further doubled and the frequency of the counter is doubled in the period of the SAD period TS3. By setting in this manner, the resolution and the AD conversion period may be optimized.

As described above, according to the present embodiment, it is possible to further improve the S/N ratio while suppressing a decrease in the frame rate.

Fourth Embodiment

Figure 19:
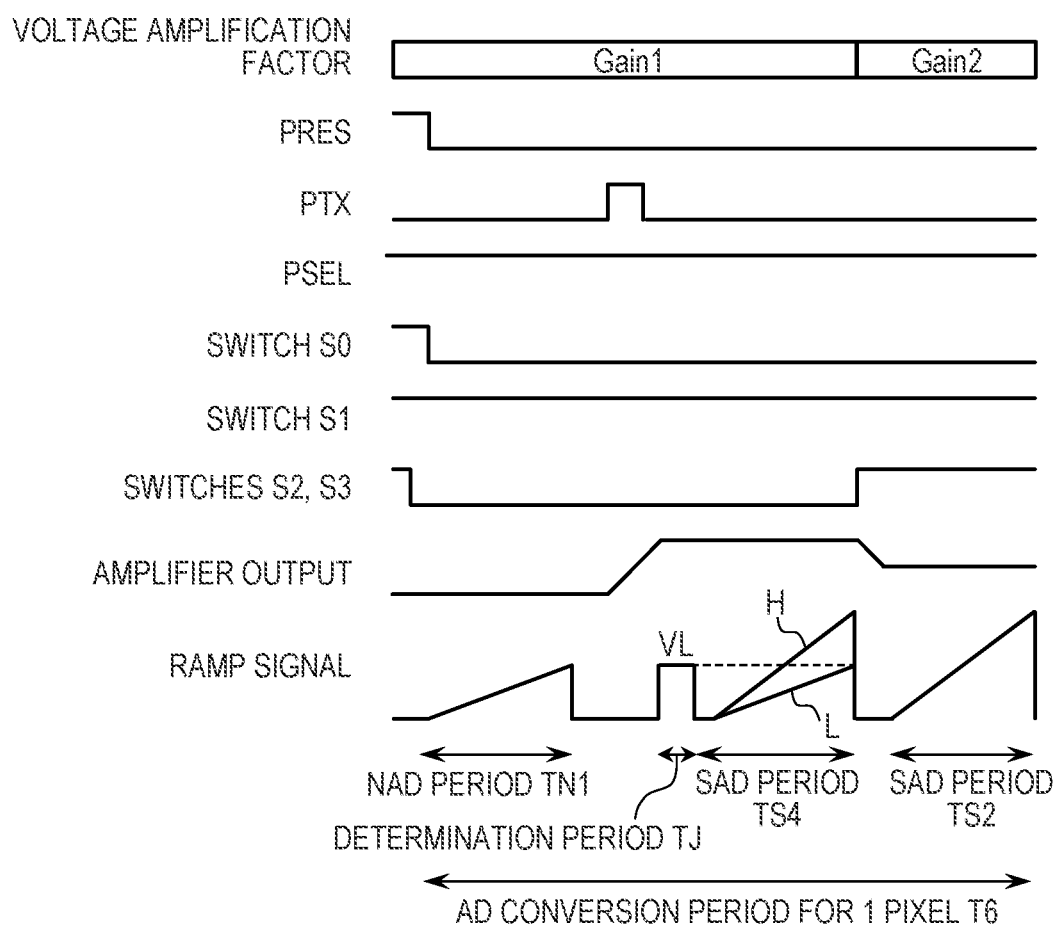
FIG. 19 is a timing chart illustrating a method of driving a photoelectric conversion device according to a fourth embodiment of the present invention.
Figure 20:
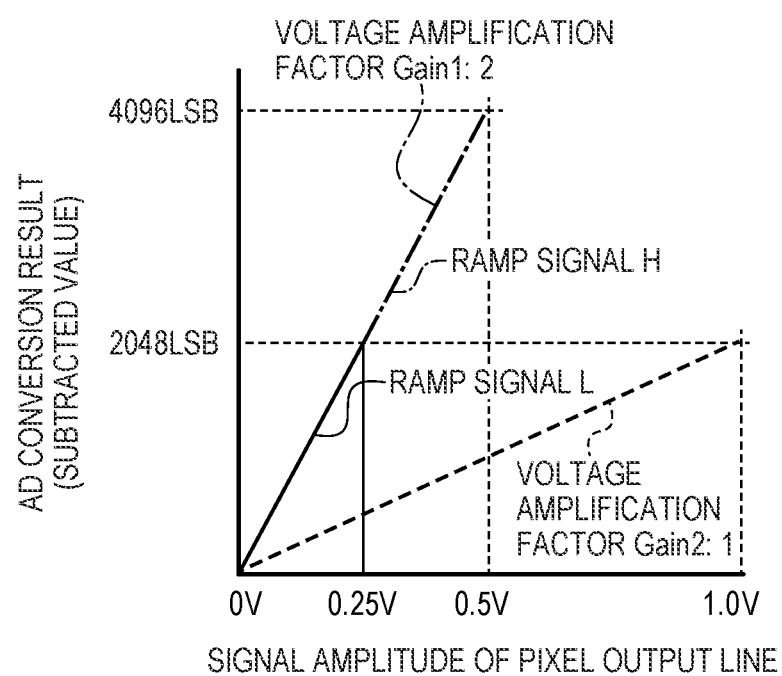
FIG. 20 and FIG. 21 are graphs illustrating an example of a digital signal processing in the method of driving the photoelectric conversion device according to the fourth embodiment of the present invention.
Figure 21:
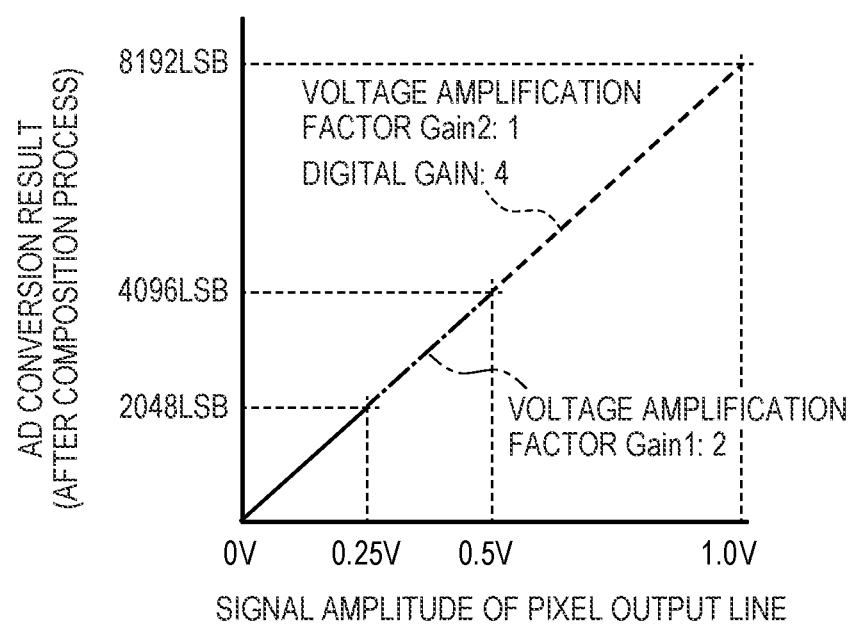

A method of driving a photoelectric conversion device according to a fourth embodiment of the present invention will be described with reference to FIG. 19 to FIG. 21. FIG. 19 is a timing chart illustrating a method of driving the photoelectric conversion device according to the present embodiment. FIG. 20 and FIG. 21 are graphs for explaining an example of digital signal processing on the AD conversion value. Components similar to those of the photoelectric conversion devices according to the first to third embodiments are denoted by the same reference numerals, and description thereof will be omitted or simplified.

In the present embodiment, another method of driving the photoelectric conversion device described in the first embodiment will be described. FIG. 19 illustrates temporal changes of the voltage amplification factor of the amplifier 32, the control signals PRES, PTX, and PSEL, the control signals of the switches S0, S1, S2, and S3, the output signal of the amplifier 32, the ramp signal, the output signal of the comparator 44, and the count signal.

The driving method of the present embodiment is different from the driving example of the first embodiment in the configuration of the AD conversion in order to further increase the speed. Specifically, the SAD period TS4 is executed instead of the SAD period TS1 in the driving example of FIG. 14. A determination period TJ is added before the SAD period TS4. As the voltage amplification factor of the amplifier 32, as in the case of the first embodiment, a case where the voltage amplification factor Gain1 is 2 and the voltage amplification factor Gain2 is 1 will be described as an example.

In the SAD period TS4, AD conversion is performed using two kinds of inclination reference signals. Here, it is assumed that the two kinds of reference signals are the ramp signal H and the ramp signal L, and the slope of the ramp signal H is twice the slope of the ramp signal L. The slope of the ramp signal L is the same as the slope of the reference signal in the SAD period TS1 of the driving example of FIG. 14.

In the determination period TJ, the level of the output of the amplifier 32 and the level VL of the maximum value of the ramp signal L are compared. When the output level of the amplifier 32 is lower than the level VL, the comparison operation of the SAD period TS4 is performed using the ramp signal L. On the other hand, when the output level of the amplifier 32 is higher than the level VL, the comparison operation of the SAD period TS4 is performed using the ramp signal H. That is, when the potential change amount of the pixel output line 16 is less than 0.25 V, the AD conversion is performed at a resolution of 12 bits using the ramp signal L, and when the potential change amount of the pixel output line 16 is 0.25 V or more, the AD conversion is performed at a resolution of 11 bits using the ramp signal H.

The AD conversion value converted using the ramp signal H is combined with the AD conversion result using the ramp signal L by applying a digital gain twice that of the digital signal processing unit 70. As described with reference to FIG. 9, when the potential change amount of the pixel output line 16 is 0.25 V or more, even if the resolution is 10 bits, the influence on the image quality is small when the optical shot noise is taken into consideration. Therefore, the SAD period TS1 in the driving example of FIG. 14 may be changed to the SAD period TS4 of ½ time. On the other hand, in the SAD period TS2, as in the case of the driving example of FIG. 14, the AD conversion is performed using the reference signal having the same inclination as the ramp signal H.

The comparison operation is performed on the pixel signal amplified by the voltage amplification factor Gain1 using the ramp signal L or the ramp signal H. Specifically, when the potential change amount of the pixel output line 16 is less than 0.25 V, the comparison operation is performed using the ramp signal L. When the potential change amount of the pixel output line 16 is 0.25 V or more, a comparison operation is performed using the ramp signal H, and a digital gain twice as large as the AD conversion value obtained by the comparison operation is applied. Thereby, an AD conversion result for the pixel signal amplified by the voltage amplification factor Gain1 is obtained.

In FIG. 20, the AD conversion result using the ramp signal L of the pixel signal amplified at the voltage amplification factor Gain1 is illustrated by a solid line, and the AD conversion result using the ramp signal H of the pixel signal amplified at the voltage amplification factor Gain1 is illustrated by a one-dot chain line. The AD conversion result of the pixel signal amplified by the voltage amplification factor Gain2 is indicated by a broken line.

FIG. 21 is a graph illustrating a method of multiplying a digital gain to an AD conversion result of a pixel signal amplified at each voltage amplification factor and compositing the result as an image. The AD conversion result of the pixel signal amplified at the voltage amplification factor Gain2 becomes the same as the slope of the voltage amplification factor Gain1 by applying a digital gain of 4 times as in the case of FIG. 11.

The inclination of the reference signal may be changed in the same manner as in the comparison operation of the pixel signal amplified by the voltage amplification factor Gain1 during the comparison operation of the pixel signal amplified by the voltage amplification factor Gain2. Further, the voltage amplification factor and the slope of the ramp signal may be optimally set according to the noise and the required resolution.

As described above, in the present embodiment, the inclination of the reference signal is switched according to the output level of the pixel output line 16 and the amplifier 32. Therefore, according to the present embodiment, it is possible to further suppress the reduction of the frame rate by shortening the readout time while improving the S/N ratio.

Fifth Embodiment

Figure 22:
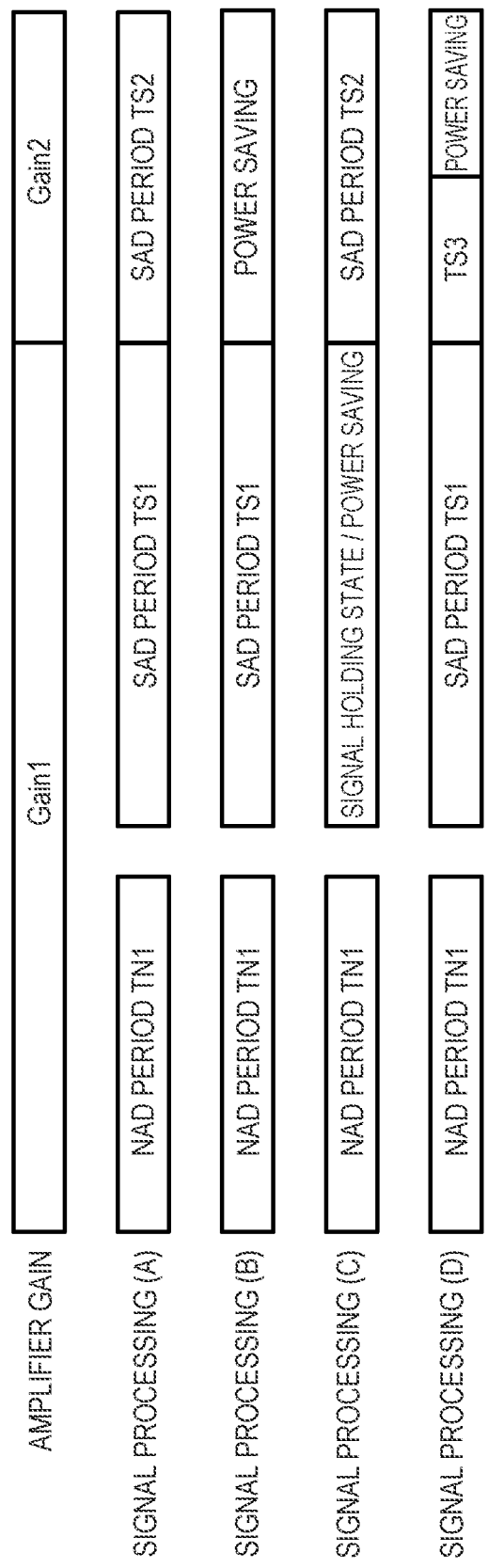
FIG. 22 is a diagram illustrating signal processing contents in a photoelectric conversion device according to a fifth embodiment of the present invention.
Figure 23:
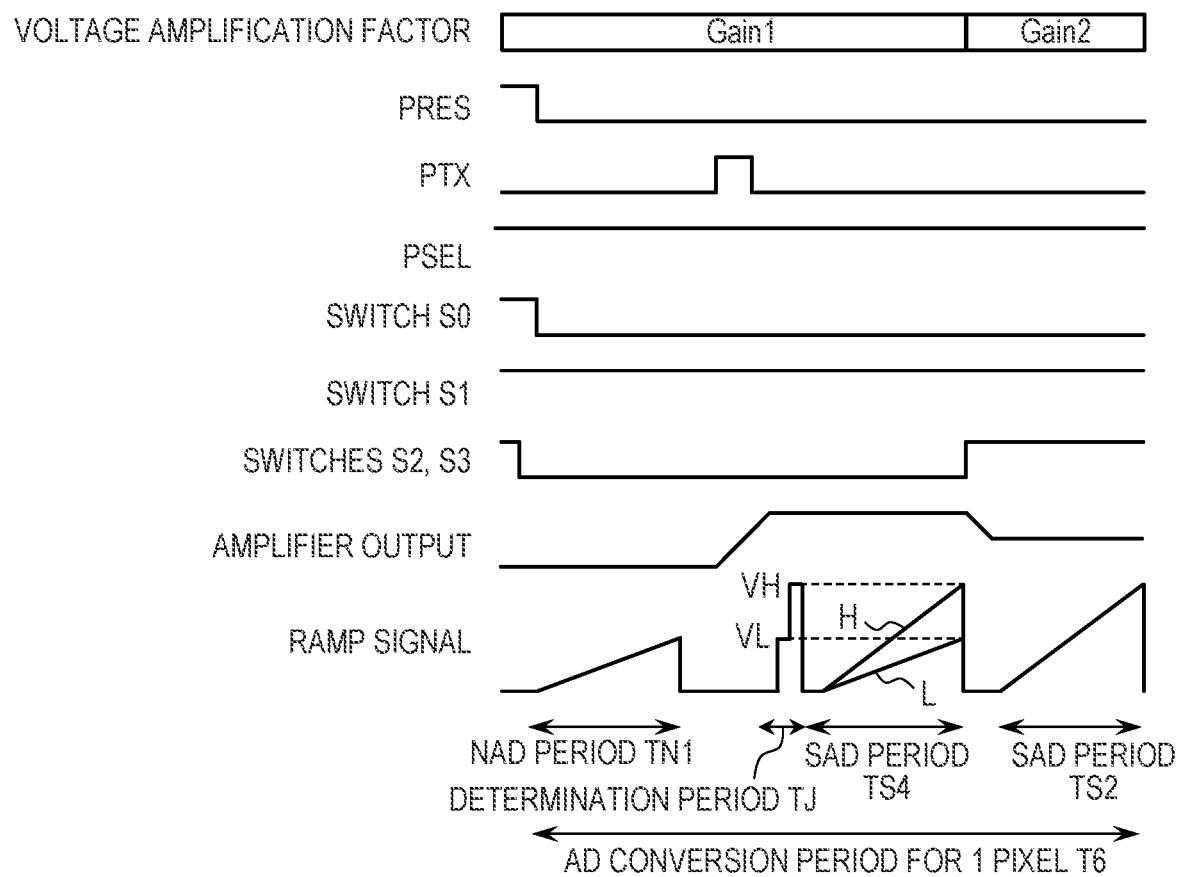
FIG. 23 is a timing chart illustrating a method of driving the photoelectric conversion device according to the fifth embodiment of the present invention.

A photoelectric conversion device and a method driving the same according to a fifth embodiment of the present invention will be described with reference to FIG. 22 and FIG. 23. FIG. 22 is a diagram illustrating signal processing contents in the photoelectric conversion device according to the present embodiment. FIG. 23 is a timing chart illustrating a method of driving the photoelectric conversion device according to the present embodiment. Components similar to those of the photoelectric conversion devices according to the first to fourth embodiments are denoted by the same reference numerals, and description thereof will be omitted or simplified.

The photoelectric conversion device according to the present embodiment is configured to be able to adjust the time of signal processing and each signal processing. That is, the photoelectric conversion device according to the present embodiment is configured to be capable of selectively executing signal processing (A) to signal processing (D), for example, as illustrated in FIG. 22.

The signal processing (A) represents the signal processing described using FIG. 10 in the first embodiment. In the driving example of FIG. 10, the comparison operation is performed in the SAD period TS2 of the pixel signal amplified at the voltage amplification factor Gain2 regardless of the result of the AD conversion in the SAD period TS1 of the pixel signal amplified at the voltage amplification factor Gain1. As described with reference to FIG. 11 to FIG. 13, when the potential change amount of the pixel output line 16 is less than 0.5 V, since the AD conversion result of the pixel signal amplified by the voltage amplification factor Gain1 is used for the image, it is not always necessary to perform the comparison operation of the voltage amplification factor Gain2.

The signal processing (B) is an example of signal processing in a case where, when the AD conversion result of the pixel signal amplified by the voltage amplification factor Gain1 does not exceed 4096 LSB, the comparison operation of the pixel signal amplified by the voltage amplification factor Gain2 is not performed, and the amplifier 32 and the comparator 44 are controlled to the power saving state. The power saving state is a state in which the driving current of the amplifier 32 or the comparator 44 is cut off or decreased.

The signal processing (C) is a signal processing example in which the comparison operation of the pixel signals amplified by the voltage amplification factor Gain1 is not performed, the pixel signals are held or in a power saving state, and only the comparison operation of the pixel signals amplified by the voltage amplification factor Gain2 is performed. As illustrated in FIG. 23, for example, the signal processing (C) may be realized by comparing the level of the output of the amplifier 32 with the level VH of the maximum value of the ramp signal H in the determination period TJ described in the fourth embodiment. That is, when it is determined that the potential change amount of the pixel output line 16 is equal to or greater than 0.5 V as a result of comparison between the output level of the amplifier 32 and the level VH, the comparison operation may be performed only on the pixel signal amplified by the voltage amplification factor Gain2.

Signal processing (D) is another example of signal processing. For example, when the voltage amplification factor Gain1 is smaller than the voltage amplification factor Gain2, the AD conversion result of the voltage amplification factor Gain2 may be predicted by multiplying the AD conversion result of the SAD period TS1 by Gain2/Gain1. For example, the SAD period TS3 in which the SAD period is shortened is executed based on the AD conversion result of the SAD period TS1, and thereafter, each block is controlled to be in the power saving state as in the signal processing (B). Since the AD conversion result is obtained by the count value, the amplitude of the pixel output line 16 may be detected from data stored in a specific upper bit of the plurality of memories 52.

As described above, in the present embodiment, the amplitude of the pixel signal is detected based on the result of the AD conversion period of different voltage amplification factors and the determination means, and the signal processing time and each processing are controlled. Therefore, according to the present embodiment, it is possible to reduce power consumption and influence of crosstalk such as noise on other pixel signals due to AD conversion.

Sixth Embodiment

Figure 24:
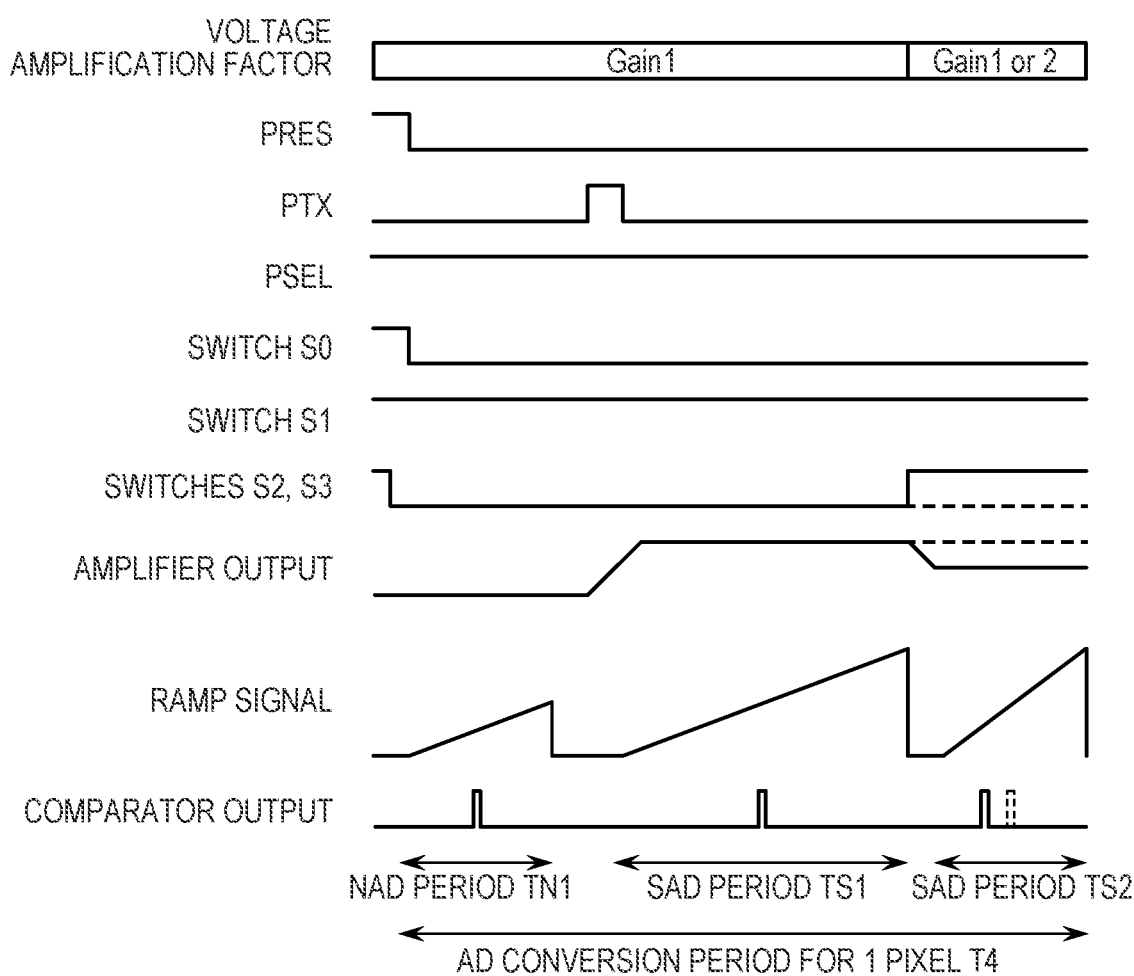
FIG. 24 is a timing chart illustrating a method of driving a photoelectric conversion device according to a sixth embodiment of the present invention.
Figure 25:
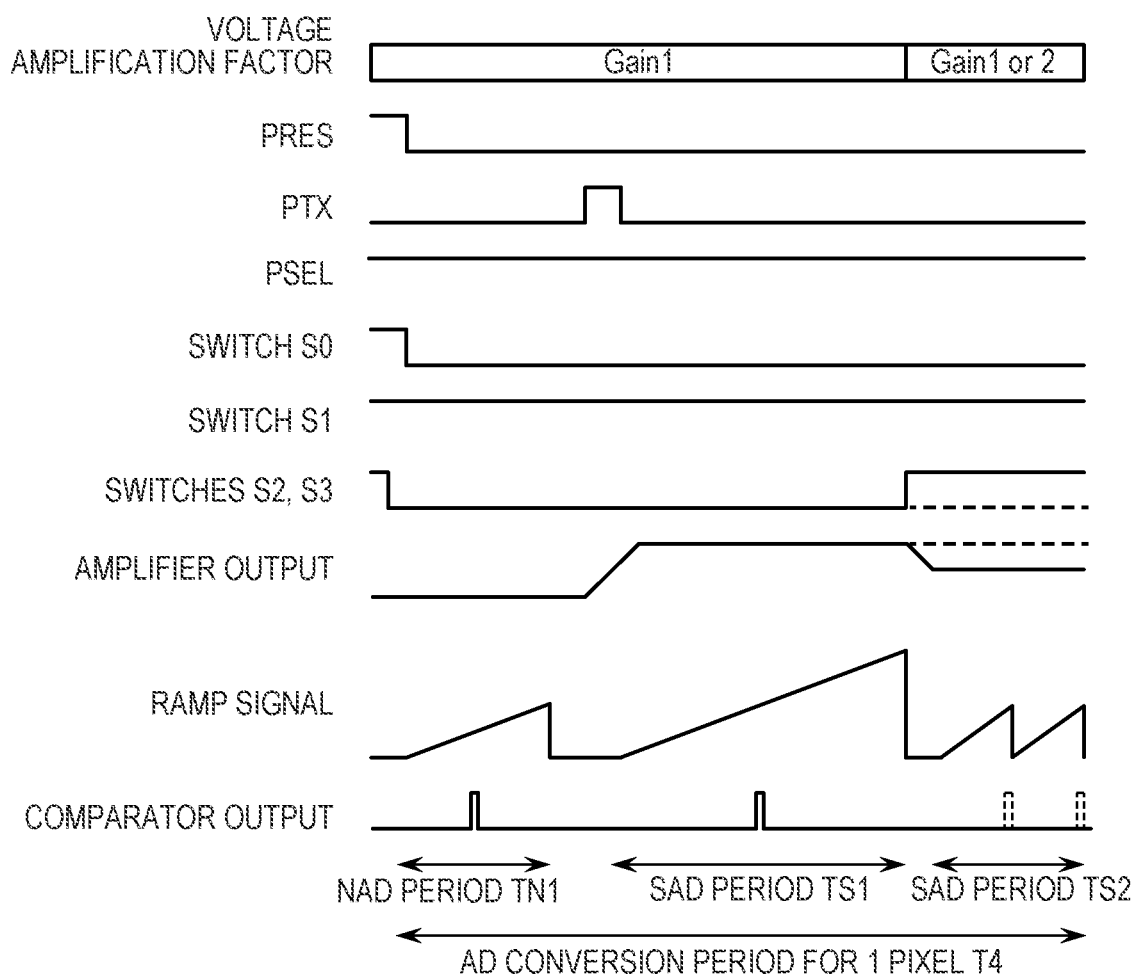
FIG. 25 is a timing chart illustrating a method of driving the photoelectric conversion device according to the sixth embodiment of the present invention.
Figure 26:
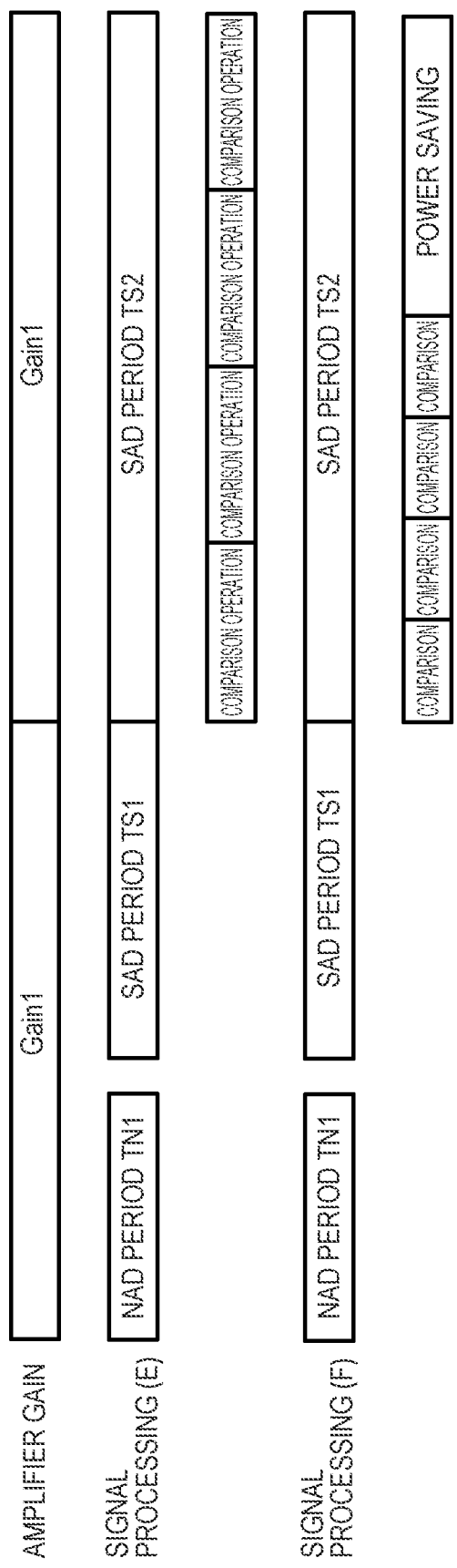
FIG. 26 is a diagram illustrating signal processing contents in the photoelectric conversion device according to the sixth embodiment of the present invention.

A photoelectric conversion device and a method of driving the same according to a sixth embodiment of the present invention will be described with reference to FIG. 24 to FIG. 26. FIG. 24 and FIG. 25 are timing charts illustrating methods of driving the photoelectric conversion device according to the present embodiment. FIG. 26 is a diagram illustrating the contents of signal processing in the photoelectric conversion device according to the embodiment. Components similar to those of the photoelectric conversion devices according to the first to fifth embodiments are denoted by the same reference numerals, and description thereof will be omitted or simplified.

In the present embodiment, another driving method of the photoelectric conversion device described in the first embodiment will be described. FIG. 24 illustrates temporal changes in the voltage amplification factor of the amplifier 32, the control signals PRES, PTX, and PSEL, the control signals of the switches S0, S1, S2, and S3, the output signal of the amplifier 32, the ramp signal, and the output signal of the comparator 44. In the driving method of the present embodiment, the voltage amplification factor may be switched during the comparison operation of the SAD period TS2.

In the driving example described with reference to FIG. 10 and FIG. 14 in the first embodiment, when the voltage amplification factor Gain1 exceeds 0.5 V when the voltage amplification factor Gain1 is 2, the potential change amount of the pixel output line 16 exceeds the input dynamic range of the AD conversion in the SAD period TS1. In this case, the AD conversion result in the SAD period TS2 in which the comparison operation of the pixel signal amplified by the voltage amplification factor Gain2 (=1) is performed is effective as the image signal.

On the other hand, when the potential change amount of the pixel output line 16 is less than 0.5 V in the SAD period TS1, as described in the fifth embodiment, the AD conversion result in the SAD period TS1 in which the comparison operation of the pixel signal amplified by the voltage amplification factor Gain1 (=2) is performed is effective as the image signal. Therefore, the comparison operation of the SAD period TS2 becomes unnecessary.

When the AD conversion value in the NAD period TN1 is assumed to be 100 LSB, in the SAD period TS1, the full scale of the AD conversion result is set to 4096 LSB, so that it is configured to be clipped to 100 LSB+4096 LSB. For example, this configuration may be achieved by adjusting count signal and the inclinations of the reference signal.

In the present embodiment, when the AD conversion result in the SAD period TS1 does not exceed 4096 LSB+ 100 LSB of full scale, the voltage amplification factor Gain2 in the SAD period TS2 is made variable.

In the driving example of FIG. 24, when the AD conversion result in the SAD period TS1 does not exceed 4096 LSB+100 LSB of full scale, the driving is performed at the voltage amplification factor Gain1 in the SAD period TS2. In FIG. 24, for the amplifier output and comparator output in the SAD period TS2, the case where the voltage amplification factor is Gain1 is indicated by a broken line, and the case where the voltage amplification factor is Gain2 is indicated by a solid line.

The result of performing the AD conversion at the same voltage amplification factor Gain1 in both the SAD periods TS1 and TS2 becomes two correlated signals, and the noise component of the result of the AD conversion may be reduced by performing the root means square signal processing. For example, if the AD conversion result of the same resolution is obtained by adjusting the frequency of the counter as described in the second embodiment, the noise component may be reduced to $1/\sqrt{2}$.

FIG. 25 illustrates a driving example in which a plurality of comparison operations is performed during the SAD period TS2 of the driving example described with reference to FIG. 24. FIG. 25 illustrates temporal changes in the voltage amplification factor of the amplifier 32, the control signals PRES, PTX, and PSEL, the control signals of the switches S0, 51, S2, and S3, the output signal of the amplifier 32, the ramp signal, and the output signal of the comparator 44. In FIG. 25, two comparison operations are performed during the SAD period TS2, but the number of comparison operations is not limited to two.

The comparison operation in the SAD period TS2 may be determined based on the AD conversion result of the SAD period TS1. For example, when the AD conversion result of the SAD period TS1 is equal to or less than ½ of the full scale, the comparison operation may be performed only for ½ of the period required for performing the AD conversion of the full scale in the SAD period TS2, and the number of comparisons may be increased. By increasing the number of comparisons, it is possible to increase the reduction amount of noise by the root mean square signal processing. In particular, since the number of comparisons may be increased as the luminance is lower, the noise reduction amount may be increased and the S/N ratio may be improved.

When the number of comparisons increases, the number of necessary memories 52 may increase. In this case, for example, if the memory 52 uses 13 bits in full scale, several bits of the 13 bits may be used for each comparison operation. By configuring the memory 52 in this manner, an increase in the memory 52 may be suppressed.

FIG. 26 schematically illustrates an example of signal processing executable in the photoelectric conversion device according to the present embodiment, similar to FIG. 22 described in the fifth embodiment.

The signal processing (E) is a driving example in which four comparison operations are performed in the SAD period TS2. The signal processing (F) is an example of a case where the luminance is lower than that of the signal processing (E), that is, an example where the period of the comparison operation is shorter than that of the signal processing (E), and is a driving example in which the comparison operation is performed four times in the SAD period TS2 and then the power saving state is set.

As described in the first embodiment, the voltage amplification factor and the slope of the reference signal may be set as appropriate. Further, as a configuration including an adjustment mechanism for adjusting the capacitance value of the floating diffusion FD of the pixel 12, a configuration may be adopted in which the capacitance value is switched based on the AD conversion result. Also, the AD conversion period of the SAD period TS1 may be reduced by combining with the second and fourth embodiments.

As described above, in the present embodiment, the voltage amplification factor and the number of comparison operations in another AD conversion period are set based on the AD conversion result. Therefore, according to the present embodiment, the S/N ratio may be further improved.

Seventh Embodiment

Figure 27:
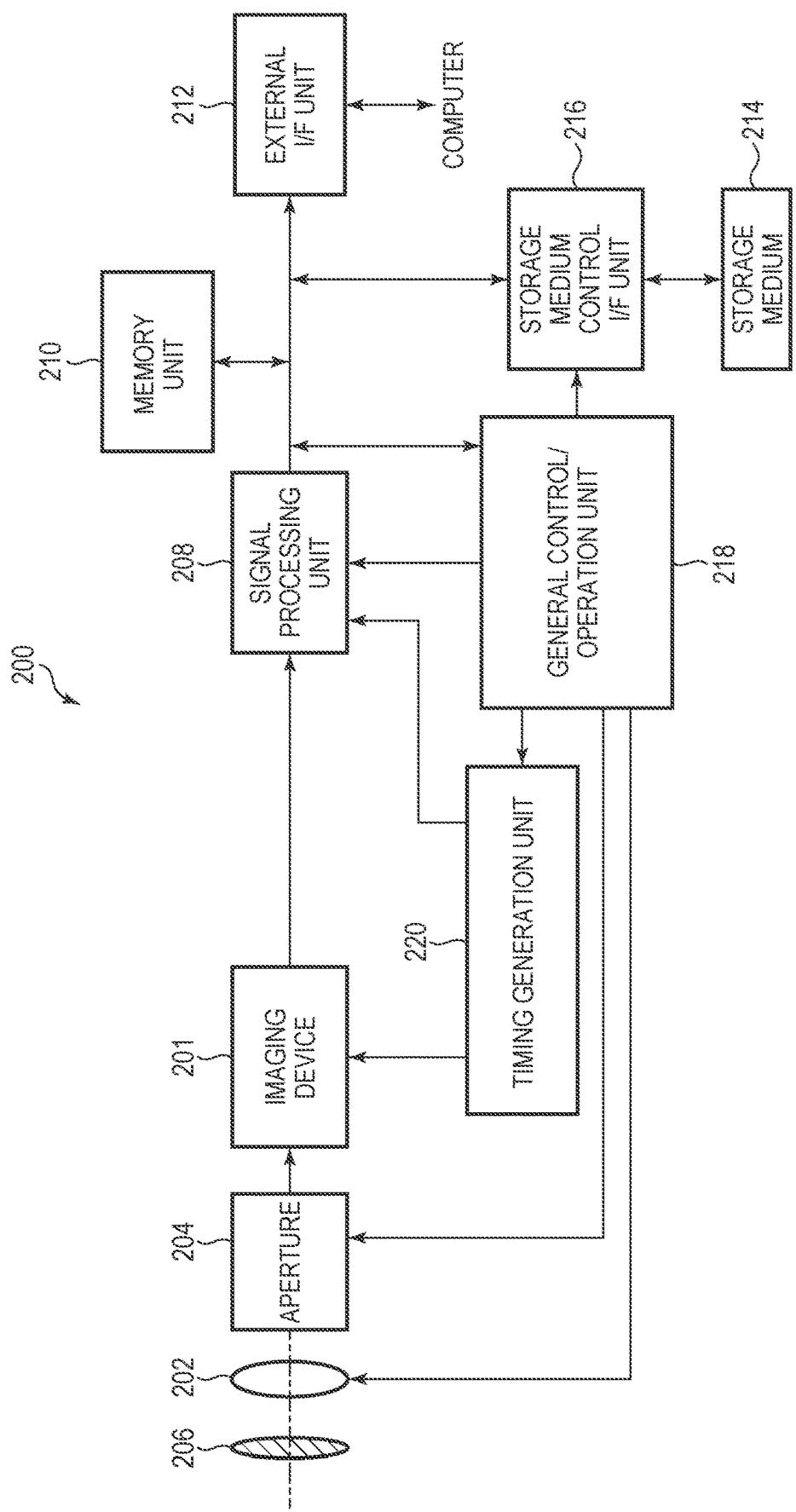
FIG. 27 is a block diagram illustrating a schematic configuration of an imaging system according to a seventh embodiment of the present invention.

An imaging system according to a seventh embodiment of the present invention will be described with reference to FIG. 27. FIG. 27 is a block diagram illustrating a schematic configuration of the imaging system according to the present embodiment.

The photoelectric conversion device 100 described in the first to sixth embodiments may be applied to various imaging systems. Examples of applicable imaging systems include digital still cameras, digital camcorders, surveillance cameras, copying machines, facsimiles, mobile phones, on-vehicle cameras, observation satellites, and the like. A camera module including an optical system such as a lens and an imaging device is also included in the imaging system. FIG. 27 is a block diagram of a digital still camera as an example of these.

The imaging system 200 illustrated in FIG. 27 includes an imaging device 201, a lens 202 for forming an optical image of an object on the imaging device 201, an aperture 204 for varying the amount of light passing through the lens 202, and a barrier 206 for protecting the lens 202. The lens 202 and the aperture 204 form an optical system that collect light on the imaging device 201. The imaging device 201 is the photoelectric conversion device 100 described in any of the first to sixth embodiments, and converts an optical image formed by the lens 202 into image data.

The imaging system 200 also includes a signal processing unit 208 that processes an output signal output from the imaging device 201. The signal processing unit 208 generates image data from a digital signal output from the imaging device 201. The signal processing unit 208 performs various corrections and compressions as necessary and outputs the processed image data. The imaging device 201 may include an AD conversion unit that generates a digital signal to be processed by the signal processing unit 208. The AD conversion unit may be formed in a semiconductor layer (semiconductor substrate) in which the photoelectric conversion unit of the imaging device 201 is formed, or may be formed in a semiconductor substrate different from the semiconductor layer in which the photoelectric conversion unit of the imaging device 201 is formed. The signal processing unit 208 may be formed on the same semiconductor substrate as the imaging device 201.

The imaging system 200 further includes a memory unit 210 for temporarily storing image data, and an external interface unit (external I/F unit) 212 for communicating with an external computer or the like. Further, the imaging system 200 includes a storage medium 214 such as a semiconductor memory for storing or reading out the imaging data, and a storage medium control interface unit (storage medium control OF unit) 216 for storing or reading out the imaging data on or from the storage medium 214. The storage medium 214 may be built in the imaging system 200, or may be detachable.

The imaging system 200 further includes a general control/operation unit 218 that controls various calculations and operations of the entire digital still camera, and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

The imaging device 201 outputs the imaging signal to the signal processing unit 208. The signal processing unit 208 performs predetermined signal processing on the imaging signal output from the imaging device 201, and outputs image data. The signal processing unit 208 generates an image using the imaging signal.

As described above, according to the present embodiment, it is possible to realize an imaging system to which the photoelectric conversion device 100 according to the first to sixth embodiments is applied.

Eighth Embodiment

Figure 28A:
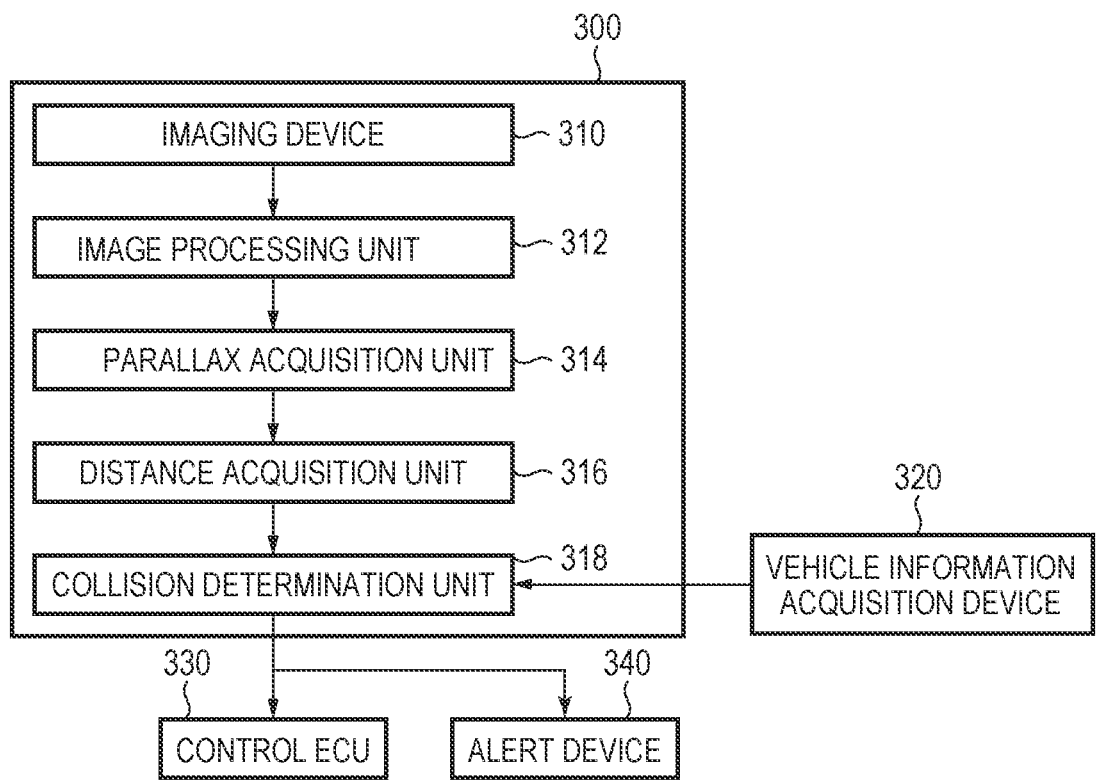
FIG. 28A is a diagram illustrating a configuration example of an imaging system according to an eighth embodiment of the present invention.
Figure 28B:
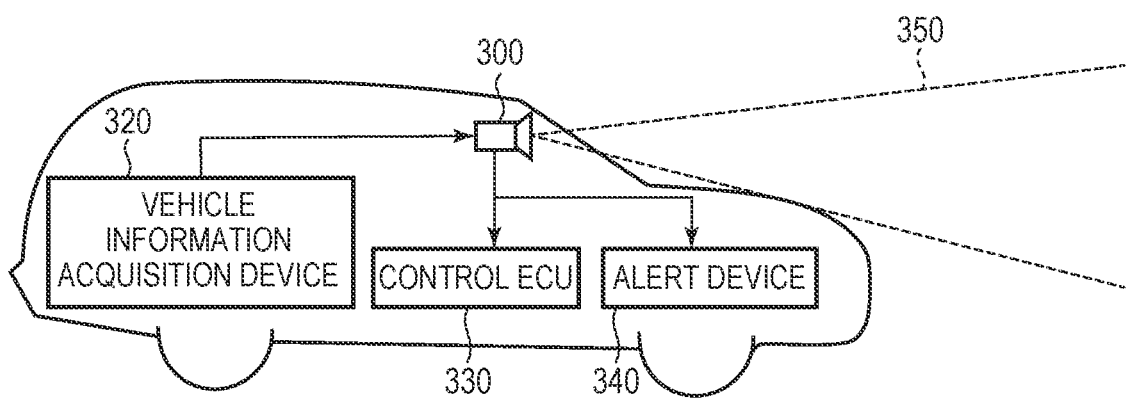
FIG. 28B is a diagram illustrating a configuration example of a movable object according to an eighth embodiment of the present invention.

An imaging system and a movable object according to an eighth embodiment of the present invention will be described with reference to FIG. 28A and FIG. 28B. FIG. 28A is a diagram illustrating a configuration of the imaging system according to the present embodiment. FIG. 28B is a diagram illustrating a configuration of the movable object according to the present embodiment.

FIG. 28A illustrates an example of an imaging system relating to an on-vehicle camera. The imaging system 300 includes an imaging device 310. The imaging device 310 is the photoelectric conversion device 100 described in any one of the first to sixth embodiments. The imaging system 300 includes an image processing unit 312 that performs image processing on a plurality of image data acquired by the imaging device 310, and a parallax acquisition unit 314 that calculates parallax (phase difference of parallax images) from the plurality of image data acquired by the imaging device 310. The imaging system 300 includes a distance acquisition unit 316 that calculates a distance to an object based on the calculated parallax, and a collision determination unit 318 that determines whether or not there is a possibility of collision based on the calculated distance. Here, the parallax acquisition unit 314 and the distance acquisition unit 316 are examples of a distance information acquisition unit that acquires distance information to the object. That is, the distance information may be information on a parallax, a defocus amount, a distance to the object, and the like. The collision determination unit 318 may determine the collision possibility using any of these pieces of distance information. The distance information obtaining unit may be implemented by dedicated hardware or software modules. Further, it may be implemented by FPGA (Field Programmable Gate Array), ASIC (Application Specific Integrated circuit), or the like, or may be implemented by a combination of these.

The imaging system 300 is connected to a vehicle information acquisition device 320, and may acquire vehicle information such as a vehicle speed, a yaw rate, and a steering angle. Further, the imaging system 300 is connected to a control ECU 330 which is a control device that outputs a control signal for generating a braking force to the vehicle based on the determination result of the collision determination unit 318. The imaging system 300 is also connected to an alert device 340 that issues an alert to the driver based on the determination result of the collision determination unit 318. For example, when the collision possibility is high as the determination result of the collision determination unit 318, the control ECU 330 performs vehicle control to avoid collision and reduce damage by braking, returning an accelerator, suppressing engine output, or the like. The alert device 340 alerts a user by sounding an alarm such as a sound, displaying alert information on a screen of a car navigation system or the like, or giving vibration to a seat belt or a steering wheel.

In the present embodiment, the imaging system 300 images the periphery of the vehicle, for example, the front or the rear. FIG. 28B illustrates an imaging system in the case of imaging an image in front of a vehicle (an imaging range 350). The vehicle information acquisition device 320 sends an instruction to the imaging system 300 or the imaging device 310. With such a configuration, the accuracy of distance measurement may be further improved.

In the above description, an example has been described in which control is performed so as not to collide with other vehicles, but the present invention is also applicable to control of automatic driving following other vehicles, control of automatic driving so as not to go out of a lane, and the like. Further, the imaging system is not limited to a vehicle such as a host vehicle, and may be applied to, for example, a movable object (moving device) such as a ship, an aircraft, or an industrial robot. In addition, the present invention may be applied not only to a movable object but also to a wide variety of equipment such as an intelligent transport system (ITS).

Ninth Embodiment

Figure 29:
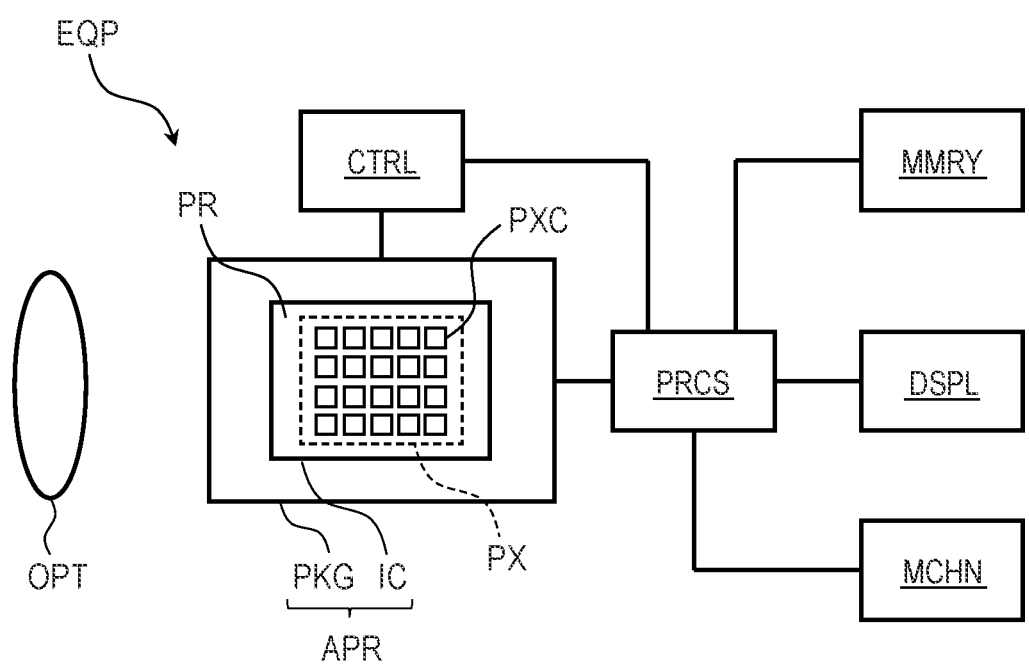
FIG. 29 is a block diagram illustrating a schematic configuration of equipment according to a ninth embodiment of the present invention.

Equipment according to a ninth embodiment of the present invention will be described with reference to FIG. 29. FIG. 29 is a block diagram illustrating a schematic configuration of equipment according to the present embodiment.

FIG. 29 is a schematic diagram illustrating equipment EQP including the photoelectric conversion device APR. The photoelectric conversion device APR has the function of the photoelectric conversion device 100 of any one of the first to sixth embodiments. All or a part of the photoelectric conversion device APR is a semiconductor device IC. The photoelectric conversion device APR of this example may be used, for example, as an image sensor, an AF (Auto Focus) sensor, a photometry sensor, or a distance measurement sensor. The semiconductor device IC includes a pixel area PX in which pixel circuits PXC including photoelectric conversion units are arranged in a matrix. The semiconductor device IC may include a peripheral area PR around the pixel area PX. Circuits other than the pixel circuits may be arranged in the peripheral area PR.

The photoelectric conversion device APR may have a structure (chip stacked structure) in which a first semiconductor chip provided with a plurality of photoelectric conversion units and a second semiconductor chip provided with peripheral circuits are stacked. Each peripheral circuit in the second semiconductor chip may be a column circuit corresponding to a pixel column of the first semiconductor chip. The peripheral circuits in the second semiconductor chip may be matrix circuits corresponding to the pixels or the pixel blocks of the first semiconductor chip. As a connection between the first semiconductor chip and the second semiconductor chip, a through electrode (TSV), an inter-chip interconnection by direct bonding of a conductor such as copper, a connection by micro bumps between chips, a connection by wire bonding, or the like may be adopted.

In addition to the semiconductor device IC, the photoelectric conversion device APR may include a package PKG that accommodates the semiconductor device IC. The package PKG may include a base body to which the semiconductor device IC is fixed, a lid body made of glass or the like facing the semiconductor device IC, and a connection member such as a bonding wire or a bump that connects terminals provided on the base body to terminals provided on the semiconductor device IC.

The equipment EQP may further comprise at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is, for example, a semiconductor device such as an ASIC (Application Specific Integrated Circuit). The processing device PRCS processes a signal output from the photoelectric conversion device APR, and constitutes an AFE (analog front end) or a DFE (digital front end). The processing unit PRCS is a semiconductor device such as a central processing unit (CPU) or an ASIC. The display device DSPL may be an EL display device or a liquid crystal display device which displays information (image) obtained by the photoelectric conversion device APR. The storage device MMRY may be a magnetic device or a semiconductor device that stores information (images) obtained by the photoelectric conversion device APR. The storage device MMRY may be a volatile memory such as an SRAM or a DRAM, or a nonvolatile memory such as a flash memory or a hard disk drive. The mechanical device MCHN includes a movable portion or a propulsion portion such as a motor or an engine. In the equipment EQP, a signal output from the photoelectric conversion device APR may be displayed on the display device DSPL, and is transmitted to the outside by a communication device (not illustrated) included in the equipment EQP. Therefore, it is preferable that the equipment EQP further include a storage device MMRY and a processing device PRCS separately from the storage circuit unit and the arithmetic circuit unit included in the photoelectric conversion device APR.

The equipment EQP illustrated in FIG. 29 may be an electronic device such as an information terminal (for example, a smartphone or a wearable terminal) having a photographing function or a camera (for example, an interchangeable lens camera, a compact camera, a video camera, and a surveillance camera). The mechanical device MCHN in the camera may drive components of the optical device OPT for zooming, focusing, and shutter operation. The equipment EQP may be a transportation device (movable object) such as a vehicle, a ship, or an airplane. The equipment EQP may be a medical device such as an endoscope or a CT scanner.

The mechanical device MCHN in the transport device may be used as a mobile device. The equipment EQP as a transport device is suitable for transporting the photoelectric conversion device APR, or for assisting and/or automating operation (manipulation) by an imaging function. The processing device PRCS for assisting and/or automating operation (manipulation) may perform processing for operating the mechanical device MCHN as a mobile device based on information obtained by the photoelectric conversion device APR.

The photoelectric conversion device APR according to the present embodiment may provide the designer, the manufacturer, the seller, the purchaser, and/or the user with high value. Therefore, when the photoelectric conversion device APR is mounted on the equipment EQP, the value of the equipment EQP may be increased. Therefore, in order to increase the value of the equipment EQP, it is advantageous to determine the mounting of the photoelectric conversion device APR of the present embodiment on the equipment EQP when the equipment EQP is manufactured and sold.

Modified Embodiments

The present invention is not limited to the above-described embodiments, and various modifications are possible.

For example, an example in which some of the configurations of any of the embodiments are added to other embodiments or an example in which some of the configurations of any of the embodiments are substituted with some of the configurations of the other embodiments is also an embodiment of the present invention.

The circuit configuration of the pixel 12 illustrated in FIG. 2 is an example, and may be changed as appropriate. For example, each pixel 12 may include two or more photoelectric conversion elements. Further, a plurality of photoelectric conversion elements of one pixel 12 may constitute a pupil division pixel sharing one microlens. The pixel 12 does not necessarily have to include the select transistor M4. The capacitance value of the floating diffusion FD may be switchable. In this case, the voltage amplification factor of the pixel signal may be set by a combination of the amplification factor (gain Gsf) of the source follower circuit which may be switched by the capacitance value of the floating diffusion FD and the amplification factor of the amplifier 32.

Although one pixel output line 16 is arranged in each column in the above embodiment, two or more pixel output lines 16 may be arranged in each column. In this case, each pixel 12 may be connected to one of the pixel output lines 16 in each column, or may include a plurality of select transistors corresponding to the number of the pixel output lines 16 in each column.

The circuit configuration of the amplifier 32 illustrated in FIG. 3 is an example, and may be appropriately changed. For example, in the configuration example of FIG. 3, three feedback capacitors C1, C2, and C3 may be connected in parallel to the amplifier circuit 34, but the number of feedback capacitors is not limited thereto. Although the input capacitor C0 is provided in the configuration example of FIG. 3, the capacitance value of the input capacitance may be switchable. The circuit configuration of the amplifier 32 may be appropriately changed according to the type of necessary voltage amplification factor and the like.

The imaging systems described in the seventh and eighth embodiments are examples of imaging systems to which the photoelectric conversion device of the present invention may be applied, and imaging systems to which the photoelectric conversion device of the present invention may be applied are not limited to the configurations illustrated in FIG. 27 and FIG. 28A.

The equipment described in the ninth embodiment is an example of equipment to which the photoelectric conversion device of the present invention may be applied, and the device to which the photoelectric conversion device of the present invention may be applied is not limited to the configuration illustrated in FIG. 14.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-150295, filed Sep. 15, 2021, which is hereby incorporated by reference herein in its entirety.

What is claimed is:

1. A photoelectric conversion device comprising:
a pixel including a photoelectric conversion unit;
an AD conversion unit that performs an AD conversion on an analog signal generated in the pixel by comparing a level of the analog signal with a level of a reference signal whose level changes with time; and
a control unit configured to control the AD conversion unit,
wherein the control unit is configured to control the AD conversion unit to perform a plurality of times of the AD conversion on the same analog signal generated in the pixel,
wherein a length of a first AD conversion period of the plurality of times of the AD conversion is shorter than a length of a second AD conversion period of the plurality of times of the AD conversion,
wherein a rate of change with respect to time of the reference signal used in the second AD conversion period is smaller than a rate of change with respect to time of the reference signal used in the first AD conversion period,
wherein, in the second AD conversion period, a potential of the reference signal changes to a first level, and
wherein, in the first AD conversion period, a potential of the reference signal changes to the first level.

2. The photoelectric conversion device according to claim 1,
wherein the AD conversion unit includes a comparator configured to perform a comparison operation between a level of the analog signal and a level of the reference signal.

3. The photoelectric conversion device according to claim 1,
wherein the AD conversion unit includes
a comparator configured to perform a comparison operation between a level of the analog signal and a level of the reference signal; and
a counter configured to start counting a clock signal in response to a start of the comparison operation, and
wherein a frequency of the counter in the first AD conversion period is different from a frequency of the counter in the second AD conversion period.

4. The photoelectric conversion device according to claim 3 further comprising a digital signal processing unit configured to perform a digital signal processing on a digital signal transferred from the AD conversion unit,
wherein the digital signal processing unit performs a digital gain processing on the digital signal according to a frequency of the counter.

5. The photoelectric conversion device according to claim 1, wherein the control unit sets the rate of change of the reference signal with respect to time in at least one of the plurality of times of the AD conversion according to a level of the analog signal.

6. The photoelectric conversion device according to claim 1 further comprising an amplification unit configured to amplify the analog signal,
wherein the AD conversion unit is configured to perform the AD conversion on the analog signal amplified by the amplifier.

7. The photoelectric conversion device according to claim 6,
wherein the amplification unit is configured to be capable of changing an amplification factor, and
wherein the AD conversion unit performs the AD conversion on the analog signal amplified at a first amplification factor in the first AD conversion period, and performs the AD conversion on the analog signal amplified at a second amplification factor in the second AD conversion period.

8. The photoelectric conversion device according to claim 6,
wherein the amplification unit is configured to be capable of changing an amplification factor, and
wherein the control unit sets a length of an AD conversion period in at least one of the plurality of times of the AD conversion in accordance with an amplification factor of the amplification unit.

9. The photoelectric conversion device according to claim 6, wherein the AD conversion unit is configured to perform the AD conversion on each of signals obtained by amplifying the analog signal at at least three amplification factors.

10. The photoelectric conversion device according to claim 6, wherein the control unit sets an amplification factor of the analog signal to be subjected to an AD conversion in one of the plurality of times of the AD conversion based on an AD conversion result in the other of the plurality of times of AD conversion.

11. The photoelectric conversion device according to claim 6 further comprising a digital signal processing unit configured to perform a digital signal processing on a digital signal transferred from the AD conversion unit,
wherein the digital signal processing unit performs a digital gain processing on the digital signal according to an amplification factor of the analog signal.

12. The photoelectric conversion device according to claim 1, wherein the control unit sets a length of an AD conversion period in one of the plurality of times of the AD conversion based on an AD conversion result in the other of the plurality of times of the AD conversion.

13. The photoelectric conversion device according to claim 1, wherein the control unit controls a driving current of the AD conversion unit in one of the plurality of times of the AD conversion based on an AD conversion result in the other of the plurality of times of the AD conversion.

14. The photoelectric conversion device according to claim 1, wherein the control unit sets the number of times of the AD conversion based on an AD conversion result in one AD conversion.

15. The photoelectric conversion device according to claim 1 further comprising a digital signal processing unit configured to perform a digital signal processing on a digital signal transferred from the AD conversion unit,
   wherein the AD conversion unit is configured to reduce the number of bits of at least a part of the plurality of digital signals obtained by the plurality of times of the AD conversion and to transfer the digital signals the number of bits of which is reduced to the digital signal processing unit.

16. The photoelectric conversion device according to claim 15, wherein the digital signal processing unit generates an image signal by combining a plurality of digital signals obtained by the plurality of times of the AD conversion.

17. The photoelectric conversion device according to claim 15, wherein the digital signal processing unit generates a phase difference detection signal based on a plurality of digital signals obtained by the plurality of times of the AD conversion.

18. The photoelectric conversion device according to claim 15, wherein the digital signal processing unit generates an image signal by performing averaging processing on a plurality of digital signals obtained by the plurality of times of the AD conversion.

19. The photoelectric conversion device according to claim 1 further comprising a digital signal processing unit configured to perform a digital signal processing on a digital signal transferred from the AD conversion unit,
   wherein the digital signal processing unit is configured to reduce the number of bits of at least a part of the plurality of digital signals obtained by the plurality of times of the AD conversion and to perform the digital signal processing on the digital signals the number of bits of which is reduced.

20. The photoelectric conversion device according to claim 1 further comprising a digital signal processing unit configured to perform a digital signal processing on a digital signal transferred from the AD conversion unit,
   wherein the digital signal processing unit performs a digital gain processing on the digital signal according to a rate of change of the reference signal with respect to time.

21. An imaging system comprising:
   the photoelectric conversion device according to claim 1; and
   a signal processing unit configured to process a signal output from the photoelectric conversion device.

22. A movable object comprising:
   the photoelectric conversion device according to claim 1;
   a distance information acquisition unit configured to acquire distance information to an object from a parallax image based on a signal from the photoelectric conversion device; and
   a control unit configured to control the movable object based on the distance information.

23. Equipment comprising:
   the photoelectric conversion device according to claim 1, and
   at least one of
      an optical device corresponding to the photoelectric conversion device,
      a control device configured to control the photoelectric conversion device,
      a processing device configured to process a signal output from the photoelectric conversion device,
      a mechanical device that is controlled based on information obtained by the photoelectric conversion device,
      a display device configured to display information obtained by the photoelectric conversion device, and
      a storage device configured to store information obtained by the photoelectric conversion device.

24. A method of driving a photoelectric conversion device including a pixel including a photoelectric conversion unit, and an AD conversion unit configured to perform an AD conversion on an analog signal generated in the pixel by comparing a level of the analog signal with a level of a reference signal whose level changes with time, the method comprising:
   performing a plurality of times of the AD conversion with different lengths of AD conversion periods on the same analog signal generated in the pixel to acquire a plurality of digital signals corresponding to the plurality of times of the AD conversion; and
   generating an image signal by compositing the plurality of digital signals,
   wherein a length of a first AD conversion period of the plurality of times of the AD conversion is shorter than a length of a second AD conversion period of the plurality of times of the AD conversion, a rate of change with respect to time of the reference signal used in the second AD conversion period is smaller than a rate of change with respect to time of the reference signal used in the first AD conversion period, a potential of the reference signal changes to a first level in the second AD conversion period, and a potential of the reference signal changes to the first level in the first AD conversion period.

* * * * *